United States Patent
Harrington et al.

(10) Patent No.: US 8,389,616 B2
(45) Date of Patent: Mar. 5, 2013

(54) MODIFIERS FOR NITRILE CONTAINING ELASTOMERS

(75) Inventors: Bruce A. Harrington, Houston, TX (US); David B. Dunaway, Houston, TX (US); Chon-Yie Lin, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 216 days.

(21) Appl. No.: 12/705,835

(22) Filed: Feb. 15, 2010

(65) Prior Publication Data

US 2011/0201750 A1   Aug. 18, 2011

(51) Int. Cl.
*C08K 5/01* (2006.01)

(52) U.S. Cl. ......... 524/474; 524/490; 524/491; 524/521

(58) Field of Classification Search ................. 524/474, 524/490, 491, 521
See application file for complete search history.

(56) References Cited

U.S. PATENT DOCUMENTS

| | | | |
|---|---|---|---|
| 2,657,190 A * | 10/1953 | Banes et al. | 524/521 |
| 4,853,154 A | 8/1989 | Icenogle et al. | |
| 5,333,662 A | 8/1994 | Costemalle et al. | |
| 5,362,787 A | 11/1994 | Ngoc et al. | |
| 5,386,864 A | 2/1995 | Costemalle et al. | |
| 5,717,021 A | 2/1998 | Huang et al. | |
| 7,056,971 B2 | 6/2006 | Varma | |
| 2002/0160137 A1 | 10/2002 | Varma | |
| 2006/0124218 A1 | 6/2006 | Nahmias Nanni et al. | |
| 2006/0167184 A1 | 7/2006 | Waddell et al. | |
| 2006/0229402 A1 | 10/2006 | Varma | |
| 2009/0186965 A1 | 7/2009 | Rodgers et al. | |
| 2010/0036038 A1 | 2/2010 | Rodgers et al. | |

FOREIGN PATENT DOCUMENTS

| | | |
|---|---|---|
| EP | 0 842 983 | 5/1998 |
| EP | 1 152 029 | 11/2001 |
| FR | 2 925 061 | 6/2009 |
| JP | 04-255742 | 9/1992 |
| JP | 2004-175994 | 6/2004 |
| JP | 2008-291117 | 12/2008 |
| WO | WO 02/064676 | 8/2002 |
| WO | WO 2004/014996 | 2/2004 |
| WO | WO 2006/128647 | 12/2006 |
| WO | WO 2009/077541 | 6/2009 |

OTHER PUBLICATIONS

Paul J. Brower, *The Evaluation of Polybutene in Ethylene/Vinyl Acetate Hot Melt Adhesives*, European Adhesives and Sealants, Amoco Technical Service Laboratory, Naperville, IL 60566, USA, Jun. 1986, pp. 5, 6 and 10.

* cited by examiner

*Primary Examiner* — Peter D Mulcahy
(74) *Attorney, Agent, or Firm* — Catherine L. Bell; Nancy T. Krawczyk; Leandro Arechederra, III

(57) ABSTRACT

This invention relates to a polymer composition comprising: 70 wt % to 99.5 wt % of a nitrile-group containing elastomer, wherein the elastomer has: a Mooney Viscosity of 15 to 115 MU; and a nitrile monomer content of 0.5 wt % to 50 wt %; and 0.5 wt % to 30 wt % of a non-functionalized plasticizer (NFP), wherein the NFP has: a kinematic viscosity at 100° C. of 4 to 1000 cSt, a flash point of $\geq$200° C., a viscosity index of $\geq$120, and a specific gravity of $\leq$0.865; and wherein the composition has: a 25% compression set at 70 hours and $-30°$ C. that is at least 110% of the 25% compression set of same composition without the NFP tested at the same conditions, and a retained tensile strength, in MPa, after 168 hours at 175° C., that is at least about 88% of the retained tensile strength of the same composition that has not been aged.

20 Claims, No Drawings

MODIFIERS FOR NITRILE CONTAINING ELASTOMERS

FIELD OF THE INVENTION

This invention relates to improved polymer compositions comprising a nitrile-group containing elastomer and a non-functionalized plasticizer.

BACKGROUND OF THE INVENTION

Modifiers or plasticizers are commonly used in polymers to lower the melt viscosity, improve low temperature properties and increase retention of properties at service temperatures. Soft polyolefins, low-molecular weight polyolefins, paraffinic waxes and hydrocarbon-based mineral oils have been used as polyolefin plasticizers with varying degrees of success.

Traditionally, it has been thought that a hydrocarbon plasticizer such as a polyalphaolefin would not have good compatibility with polar or engineering polymers, and, therefore, the hydrocarbon plasticizer would not efficiently modify polar polymers such as nitrile-group containing elastomers. Hydrocarbon-based plasticizers are not typically compatible with nitrile-group containing elastomers, and have a tendency to exude from the polymer composition over time or at elevated temperatures. The loss of plasticizer results in the degradation of the polymer's physical properties, and often leads to premature product failures.

Thus, there is a need for improved polymer compositions comprising a nitrile-group containing elastomer and a non-functionalized plasticizer to improve the physical properties of the composition. In particular, there is an industry need for modified nitrile-group containing elastomers to improve the high temperature and processing properties without adversely affecting the natural elastomer properties and/or the low temperature properties. The compositions described herein satisfy this need.

SUMMARY OF THE INVENTION

This invention relates to a polymer composition comprising:

a. about 70 wt % to about 99.5 wt %, based upon the weight of the composition, of a nitrile-group containing elastomer selected from the group consisting of acrylonitrile-butadiene copolymer rubber, carboxylated acrylonitrile-butadiene copolymer rubber, at least partially hydrogenated acrylonitrile-butadiene copolymer rubber, at least partially hydrogenated carboxylated acrylonitrile-butadiene rubber, and mixtures thereof, wherein the elastomer has: i) a Mooney Viscosity (ASTM D 1646, 100° C., ML 1+4) of about 15 MU to about 115 MU; and ii) a nitrile monomer content of about 0.1 wt % to about 50 wt %, based upon the weight of the elastomer; and b. about 0.5 wt % to about 30 wt %, based upon the weight of the composition, of a non-functionalized plasticizer, wherein the non-functionalized plasticizer has: i) a kinematic viscosity at 100° C. of about 4 cSt to about 1000 cSt; ii) a flash point of about 200° C. or more; iii) a viscosity index of about 120 or more; and iv) a specific gravity of about 0.865 or less; and wherein the composition has: i) a 25% compression set at 70 hours and −30° C. that is at least 110% of the 25% compression set of same composition without the NFP tested at the same conditions (e.g., that has been aged at 70 hours and −30° C.); and ii) a retained tensile strength, in MPa, after 168 hours at 175° C., that is at least about 88% of the retained tensile strength of the same composition that has not been aged.

DETAILED DESCRIPTION OF THE INVENTION

This invention relates to a polymer composition comprising: about 70 wt % to about 99.5 wt %, based upon the weight of the composition, of a nitrile-group containing elastomer wherein the elastomer has: a Mooney Viscosity (ASTM D 1646, 100° C., ML 1+4) of about 15 MU to about 115 MU; a nitrile monomer content of about 0.1 wt % to about 50 wt %, based upon the weight of the elastomer; and about 0.5 wt % to about 30 wt %, based upon the weight of the composition, of a non-functionalized plasticizer.

This invention further relates to a polymer composition comprising: 1) about 70 wt % to about 99.5 wt %, based upon the weight of the composition, of a nitrile-group containing elastomer preferably selected from the group consisting of acrylonitrile-butadiene copolymer rubber (NBR), carboxylated acrylonitrile-butadiene copolymer rubber (XNBR), at least partially hydrogenated acrylonitrile-butadiene copolymer rubber (HNBR), at least partially hydrogenated carboxylated acrylonitrile-butadiene rubber (XHNBR), and mixtures thereof, wherein the elastomer has: a Mooney Viscosity (ASTM D 1646, 100° C., ML 1+4) of about 15 MU to about 115 MU; and a nitrile monomer content of about 0.1 wt % to about 50 wt %, based upon the weight of the elastomer; and 2) about 0.5 wt % to about 30 wt %, based upon the weight of the composition, of a non-functionalized plasticizer, wherein the non-functionalized plasticizer has: a kinematic viscosity (ASTM D 445) at 100° C. of about 4 cSt to about 1000 cSt, a flash point (ASTM D 92) of about 200° C. or more, a viscosity index (ASTM D 2270) of about 120 or more, and a specific gravity (ASTM D 4052, 15.6/15.6° C.) of about 0.865 or less; and wherein the composition has: a) a retained tensile strength (ASTM D 412, Die C), in MPa, after 168 hours at 175° C., that is at least about 88% of the retained tensile strength of the same composition that has not been aged; and b) a 25% compression set (ASTM D 395, Method B) at 70 hours and −30° C. that is at least 110% of the 25% compression set of same composition without the NFP tested at the same conditions. By "without the NFP" or "absent the NFP" means less than 0.01 wt % of NFP is present, based upon the weight of the composition.

The present invention further relates to a polymer composition comprising: about 70 wt % to about 99.5 wt % (preferably about 75 wt % to about 99 wt %, preferably about 80 wt % to about 98 wt %), based upon the weight of the composition, of a nitrile-group containing elastomer preferably selected from the group consisting of NBR, XNBR, HNBR, XHNBR, and mixtures thereof, wherein the elastomer has: a Mooney viscosity of about 15 MU to about 115 MU (preferably about 30 MU to about 100 MU, preferably about 40 to about 80 MU); and a nitrile monomer content of about 0.1 wt % to about 50 wt % (preferably about 10 wt % to about 45 wt %, preferably about 20 wt % to about 40 wt %), based upon the weight of the elastomer; and about 0.5 wt % to about 30 wt % (preferably about 1 wt % to about 30 wt %, preferably about 1.5 wt % to about 15 wt %, preferably about 2 wt % to about 10 wt %), based upon the weight of the composition, of a non-functionalized plasticizer, wherein the non-functionalized plasticizer has: a kinematic viscosity at 100° C. of about 4 cSt to about 1000 cSt (preferably about 6 cSt to about 300 cSt, preferably about 8 cSt to about 150 cSt); a flash point of about 200° C. or more (preferably about 210° C. or more, preferably about 220° C. or more); a viscosity index of about 120 or more (preferably about 130 or more, preferably about 150 or more); and a specific gravity of about 0.865 or less (preferably about 0.860 or less, preferably about 0.855 or less); and wherein the composition has: a) a retained tensile strength (ASTM D 412, Die C), in MPa, after 168 hours at 175° C., that is at least about 88% (preferably at least about 90%, preferably at least about 93%, preferably at least about 95%) of the retained tensile strength of the same composition that has not been aged; b) a 25% compression set (ASTM D 395, Method B) at 70 hours and −30° C. that is at least 110% of the 25% compression set of same composition without the NFP tested at the same conditions.

Alternately, the above compositions may also have a low temperature brittleness (ASTM D 2137) of about −20° C. or less (preferably about −30° C., preferably about −40° C.). Preferably, the above nitrile containing elastomer may also have a low temperature brittleness (ASTM D 2137) of about −20° C. or less (preferably about −30° C., preferably about −40° C.).

Alternately, the above compositions may also have a Mooney Viscosity of about Z or less where Z=5.3038X+99 and X is the amount in phr of non-functionalized plasticizer present in the polymer composition.

In an embodiment, the compositions described herein have less than about 0.1 wt % non-conjugated diene containing monomer.

In a preferred embodiment, the polymer compositions described herein have: i) less than about 0.5 mole % styrene containing group; and/or ii) less than about 0.1 wt % isobutylene monomer.

In a further embodiment, the polymer compositions described herein have a Shore A hardness (ASTM D 2240) that is less than 1.20 (preferably 1.10, preferably 1.05) times the Shore A hardness of the same composition that has not been aged. In a further embodiment, the polymer compositions described herein have a Shore A hardness that is greater than 0.6 (preferably 0.8, preferably 0.9) times the Shore A hardness of the same composition that has not been aged.

In another embodiment, the polymer compositions described herein have a Shore A hardness that is less than 1.20 (preferably 1.10, preferably 1.05) times the Shore A hardness of the compositions without the non-functionalized plasticizer. In another embodiment, the polymer compositions described herein have a Shore A hardness that is greater than 0.6 (preferably 0.8, preferably 0.9) times the Shore A hardness of the compositions without the non-functionalized plasticizer.

In still another embodiment, the polymer compositions described herein have a 25% compression set (ASTM D 395, Method B), after 70 hours at 150° C., that is 45% or less of the compression set of the same composition that has not been aged (preferably 40% or less, preferably 35% or less, more preferably 30% or less, and especially preferably 25% or less).

In still another embodiment, the polymer compositions described herein have a retained strain at break, in MPa, at 168 hours at 175° C. that is at least about 46% (preferably at least 50%, preferably at least 55%) of the retained strain at break of the same composition that has not been aged.

In still another embodiment, the polymer compositions described herein have a tensile modulus, in MPa, after 168 hours at 175° C. that is less than about 169.5% (preferably less than about 168%, preferably less than about 167%) of the same composition that has not been aged.

In still another embodiment, the polymer compositions described herein have a 25% compression set when stored at −30° C. for 70 hours that is at least 20% lower (preferably at least 30%, preferably at least 40%, preferably at least 50%) than of the same composition without the NFP. In another embodiment, the polymer compositions described herein have a 25% compression set when stored at −30° C. for 22 hours, allowed to warm to room temperature (32° C.) for one hour then stored at −30° C. for another 48 hours that is at least 20% (preferably at least 30%, preferably at least 40%, preferably at least 50%) lower than of the same composition without the NFP.

In still another embodiment, the polymer compositions described herein have a 25% compression set when stored at −30° C. for 70 hours that is at least 20% lower (preferably at least 30%, preferably at least 40%, preferably at least 50%) than of the same composition that has not been aged. In another embodiment, the polymer compositions described herein have a 25% compression set when stored at −30° C. for 22 hours, allowed to warm to room temperature (32° C.) for one hour then stored at −30° C. for another 48 hours that is at least 20% (preferably at least 30%, preferably at least 40%, preferably at least 50%) lower than of the same composition that has not been aged.

Nitrile-Group Containing Elastomer

The polymer compositions of the present invention include at least one nitrile-group containing elastomer. The classes of materials described herein that are useful as nitrile-group containing elastomers can be utilized alone or admixed with other nitrile-group containing elastomers described herein in order to obtain desired properties.

The nitrile-group containing elastomer is typically obtained by copolymerizing an ethylenically unsaturated nitrile monomer (such as an α,β-ethylenic unsaturated nitrile monomer), a conjugated diene monomer, and, in accordance with need, another monomer able to copolymerize with these monomers, and thereafter optionally hydrogenating the carbon-carbon unsaturated bonds of the copolymer (typically in the main chain). Preferred nitrile-group containing elastomers include:

1. copolymers of an ethylenically unsaturated nitrile and a conjugated diene;
2. at least partially hydrogenated copolymers of an ethylenically unsaturated nitrile and a conjugated diene;
3. carboxylated copolymers of an ethylenically unsaturated nitrile and a conjugated diene; and
4. carboxylated copolymers of an ethylenically unsaturated nitrile and a conjugated diene that are at least partially hydrogenated.

The proportion of conjugated diene units in the copolymers is not specifically limited, and is generally at least 40 wt % (preferably, in the range of 50 wt %-99.9 wt %, preferably 55 wt %-90 wt %, and more preferably 60 wt %-80 wt %). Suitable conjugated dienes include: 1,3-butadiene, isoprene, 1,3-pentadiene, 2,3-dimethyl-1,3-butadiene, and chloroprene, preferably 1,3-butadiene and 2-methyl-1,3-butadiene, and more preferably 1,3-butadiene.

The proportion of the α,β-ethylenic unsaturated nitrile monomer units in the copolymers is preferably 0.1 wt % to 50 wt %, preferably 10 wt % to 45 wt %, preferably 20 wt % to 40 wt %. Suitable ethylenically unsaturated nitrile monomers include: acrylonitrile, methacrylonitrile, alpha-chloro-acrylonitrile, and methoxyacrylonitrile, preferably acrylonitrile. Suitable α,β-ethylenic unsaturated nitrile monomers include: acrylonitrile, methacrylonitrile, α-chloroacrylonitrile, preferably acrylonitrile.

Suitable ethylenically unsaturated nitrile constituting copolymers include: acrylonitrile, methacrylonitrile, alpha-chloro-acrylonitrile, and methoxyacrylonitrile, preferably acrylonitrile. The bound nitrile content of the diene rubber is not particularly limited. However, it is generally within the range of 10 wt % to 60 wt % (preferably 15 wt % to 45 wt %).

Suitable carboxylated copolymers (3) and (4) include:
a. copolymers that have carboxyl-containing monomer units introduced into their polymer chains by copolymerization of the ethylenically unsaturated nitrile and the conjugated diene with an ester of an ethylenically unsaturated monocarboxylic acid; and
b. polymers that have carboxyl-containing units introduced by addition reaction between (i) an ethylenically unsaturated dicarboxylic acid or anhydride thereof and (ii) a copolymer of an ethylenically unsaturated nitrile and a conjugated diene.

Suitable ethylenically unsaturated monocarboxylic acid esters include alkyl esters, dialkyl esters, alkoxyalkyl esters, fluoroalkyl esters, cyano group-substituted alkyl esters, and hydroxyl group-substituted alkyl esters of ethylenically unsaturated monocarboxylic acids.

Suitable ethylenically unsaturated carboxylic acids include acrylic acid and methacrylic acid.

Suitable ethylenically unsaturated dicarboxylic acids include maleic acid, fumaric acid, itaconic acid, citraconic acid, mesaconic acid, glutaconic acid, allylmalonic acid and teraconic acid.

Suitable ethylenically unsaturated dicarboxylic acid anhydrides include: maleic anhydride, itaconic anhydride and citraconic anhydride, preferably ethylenically unsaturated dicarboxylic acid anhydrides having 4 to 10 carbon atoms, more preferably alpha, beta-unsaturated dicarboxylic acid anhydrides, and especially preferably maleic anhydride.

Suitable monoalkyl esters of the unsaturated dicarboxylic acid include: monomethyl maleate, monoethyl maleate, monopropyl maleate, mono-n-butyl maleate, monoisobutyl maleate, mono-n-pentyl maleate, mono-n-hexyl maleate, mono-2-ethylhexyl maleate, monomethyl fumarate, monoethyl fumarate, monopropyl fumarate, mono-n-butyl fumarate, monoisobutyl fumarate, mono-n-pentyl fumarate, mono-n-hexyl fumarate, mono-2-ethylhexyl fumarate, monomethyl itaconate, monoethyl itaconate, monopropyl itaconate, mono-n-butyl itaconate, monoisobutyl itaconate, mono-n-pentyl itaconate, mono-n-hexyl itaconate, mono-2-ethylhexyl itaconate, monomethyl citraconate, monoethyl citraconate, monopropyl citraconate, mono-n-butyl citraconate, monoisobutyl citraconate, mono-n-pentyl citraconate, mono-n-hexyl citraconate, mono-2-ethylhexyl citraconate, monomethyl mesaconate, monoethyl mesaconate, monopropyl mesaconate, mono-n-butyl mesaconate, monoisobutyl mesaconate, mono-n-pentyl mesaconate, mono-n-hexyl mesaconate, mono-2-ethylhexyl mesaconate, monomethyl glutaconate, monoethyl glutaconate, monopropyl glutaconate, mono-n-butyl glutaconate, monoisobutyl glutaconate, mono-n-pentyl glutaconate, mono-n-hexyl glutaconate, mono-2-ethylhexyl glutaconate, monomethyl allylmalonate, monoethyl allylmalonate, monopropyl allylmalonate, mono-n-butyl allylmalonate, monoisobutyl allylmalonate, mono-n-pentyl allylmalonate, mono-n-hexyl allylmalonate, mono-2-ethynhexyl allylmalonate, monomethyl teraconate, monoethyl teraconate, monopropyl teraconate, mono-n-butyl teraconate, monoisobutyl teraconate, mono-n-pentyl teraconate, mono-n-hexyl teraconate, and mono-2-ethylhexyl teraconate.

Preferred nitrile-group containing elastomers include: acrylonitrile-butadiene copolymer rubber (NBR), carboxylated acrylonitrile-butadiene copolymer rubber (XNBR), at least partially hydrogenated acrylonitrile-butadiene copolymer rubber (HNBR), at least partially hydrogenated carboxylated acrylonitrile-butadiene rubber (XHNBR) and mixtures thereof, and more preferably acrylonitrile-butadiene copolymer rubber (NBR), at least partially hydrogenated acrylonitrile-butadiene copolymer rubber (HNBR), and mixtures thereof. The nitrile-group containing elastomers, such as NBR and/or HNBR, are generally not a liquid.

Nitrile-group containing elastomers useful herein typically have Mooney viscosity (ASTM D 1546, 100° C., ML 1+4) of 15 to 115 MU (preferably 30 to 100 MU, and more preferably 40 to 80 MU), and a nitrile monomer content of 0.1 wt % to 50 wt %, based upon the weight of the elastomer, (preferably 10 wt % to 45 wt %, and more preferably 20 wt % to 40 wt %).

The lower limit of the content of $\alpha,\beta$-ethylenically unsaturated nitrile monomer units in the nitrile group-containing elastomer is preferably 0.1 wt %, and the upper limit thereof is preferably 50 wt %, more preferably 45 wt % and especially preferably 40 wt %.

The upper limit of the iodine value (ASTM D 5902) of the nitrile group-containing elastomer is preferably 120 or less, preferably 80 or less, preferably 50 or less. Iodine value is an indication demonstrating the degree of unsaturation of carbon-carbon bond, and expressed in terms of amount in gram of iodine capable of being added to 100 g of a rubber. When a copolymer rubber having too large iodine value is produced, the copolymer rubber may be subjected to hydrogenation whereby the carbon-carbon unsaturated bonds in the copolymer rubber are hydrogenated and the iodine value of copolymer rubber is lowered.

Nitrile Rubber

NBR's physical and chemical properties vary depending on the nitrile content of the elastomer. In particular, the higher the nitrile content in the polymer composition, the higher the resistance to oils and the lower the flexibility of the elastomer. NBR is generally resistant to oil, fuel, and other chemicals. Nitrile rubber is more resistant than natural rubber to oils and acids, but it can have inferior strength and flexibility. Nitrile rubber is generally resistant to aliphatic hydrocarbons, but, like natural rubber, it can be attacked by ozone, aromatic hydrocarbons, ketones, esters and aldehydes.

NBRs useful herein typically have up to 0.1 wt % to 50 wt % acrylonitrile, based on the weight of the polymer composition, (preferably 10 wt % to 45 wt %, and more preferably 20 wt % to 40 wt %).

In a preferred embodiment, the nitrile-group containing elastomers (such as NBR and HNBR) useful herein have: i) less than about 0.5 mole % styrene containing group; and/or ii) less than about 0.1 weight % isobutylene monomer.

In a preferred embodiment, the NBR useful herein typically have a Mooney viscosity of 15 to 115 MU (preferably 30 to 100 MU, and more preferably 40 to 80 MU).

Hydrogenated Nitrile Rubber

Hydrogenated nitrile rubber (HNBR) is a derivative of nitrile rubber, which is hydrogenated in solution typically using precious metal catalysts. The nitrile groups are unaffected during the process, but the carbon-carbon double bonds in nitrile rubber are converted into more stable single bonds. Different grades can be made by precise control of the proportion of unconverted double bonds in the material. A material containing 10 wt % unsaturation (partially hydrogenated) is typically considered to be an upper limit, but grades containing 4 wt % to 8 wt % unsaturation (partially hydrogenated) or virtually no double bonds (fully hydrogenated) are useful herein. Partially hydrogenated materials can be cross-linked using both sulphur and peroxide cure systems, and the fully hydrogenated grades can be cross-linked with peroxides.

HNBRs useful herein typically have up to 0.1 wt % to 50 wt % acrylonitrile, based on the weight of the polymer composition, (preferably 10 wt % to 45 wt %, and more preferably 20 wt % to 40 wt %).

HNBRs useful herein typically have up to 15 wt % unsaturation (ASTM D 5670, in event of conflict between procedure 7.1.1 and 7.1.2, 7.1.1 shall control), preferably up to 8 wt %, preferably from 4 wt % to 8 wt % unsaturation, and more preferably 6 wt % to 8 wt % unsaturation.

HNBRs useful herein typically have a Mooney viscosity of 15 to 115 MU (preferably 30 to 100 MU, and more preferably 40 to 80 MU).

In a preferred embodiment, the nitrile-group containing elastomers (such as NBR and HNBR) useful herein have: i) less than about 0.5 mole % styrene containing group; and/or ii) less than about 0.1 weight % isobutylene monomer.

Desirable nitrile-group containing elastomers are commercially available under the trade names NIPOL® (Zeon Chemicals) nitrile elastomers, NIPOL® (Zeon Chemicals) carboxylated nitrile elastomers, ZETPOL® (Zeon Chemicals) hydrogenated nitrile elastomers and ZEOFORTE® (Zeon Chemicals) modified hydrogenated nitrile elastomers, some of which are summarized in Tables 1-4.

TABLE 1

General Purpose NIPOL ® Nitrile Elastomers

| Grade | Acrylonitrile, % | Mooney Viscosity, MU | Specific gravity |
|---|---|---|---|
| N300 | 40 | 50-63 | 1.00 |
| 35-8 | 35 | 66-80 | 0.98 |
| 35-5 | 35 | 43-53 | 0.98 |
| 1042 | 33 | 75-90 | 0.98 |
| DN219 | 33 | 23-32 | 0.98 |
| 33-3 | 33 | 25-34 | 0.98 |
| 30-8 | 30 | 60-74 | 0.97 |
| 30-5 | 30 | 42-52 | 0.97 |
| DN202 | 31 | 58-68 | 0.98 |

TABLE 2

NIPOL ® Carboxylated Nitrile Elastomers

| Grade | Acrylonitrile, % | Mooney Viscosity, MU | Specific gravity |
|---|---|---|---|
| NX775 | 26 | 38-52 | 0.98 |
| 1072 | 27 | 40-55 | 0.98 |
| 1072CGX | 27 | 20-30 | 0.98 |
| 1072X28 | 27 | 35-55 | 0.98 |
| DN631 | 33 | 45-55 | 0.98 |

TABLE 3

ZETPOL ® Hydrogenated Nitrile Elastomers

| Grade | Acrylonitrile, % | Mooney Viscosity, MU | Specific gravity | Hydrogenation, % | Iodine Value |
|---|---|---|---|---|---|
| 0020 | 50 | 58-72 | 1.00 | 91 | 23 |
| 1000L | 44 | 58-72 | 0.98 | 98 | 7 |
| 1010 | 44 | 78-92 | 0.98 | 96 | 10 |
| 1020 | 44 | 71-85 | 0.98 | 91 | 24 |
| 1020L | 44 | 47-67 | 0.98 | 91 | 24 |
| 2000 | 36 | 78-92 | 0.95 | >99.5 | 4 |
| 2000L | 36 | 58-72 | 0.95 | >99.5 | 4 |
| 2000LL | 36 | 4-60 | 0.95 | >99.5 | 7 |
| 2010H | 36 | >120 | 0.95 | 96 | 11 |
| 2010 | 36 | 78-92 | 0.95 | 96 | 11 |
| 2010L | 36 | 50-65 | 0.95 | 96 | 11 |
| 2011L | 36 | 53-63 | 0.95 | 94 | 18 |
| 2020 | 36 | 71-85 | 0.95 | 91 | 28 |
| 2020L | 36 | 50-65 | 0.95 | 91 | 28 |
| 2030H | 36 | >110 | 0.95 | 85 | 37 |
| 2030L | 36 | 50-65 | 0.95 | 85 | 57 |
| 3310 | 25 | 60-100 | 0.97 | 95 | 15 |
| 4300 | 17 | 55-95 | 0.95 | >99.5 | 10 |
| 4310 | 17 | 52-72 | 0.98 | 95 | 15 |
| 4320 | 17 | 50-70 | 0.98 | 91 | 27 |
| PBZ-123 | 44 | 71-91 | 1.08 | 91 | 4 |

TABLE 4

ZEOFORTE ® Modified Hydrogenated Nitrile Elastomers

| Grade | Acrylonitrile[1], % | Mooney Viscosity | Specific gravity | Hydrog[1], % | Iodine value | Special Properties |
|---|---|---|---|---|---|---|
| ZSC 2295CX | 36 | 80-110 | 1.20 | 91 | 28 | Zetpol 2020 modified with zinc methacrylate |
| ZSC 2295L | 36 | 60-100 | 1.20 | 91 | 28 | Low Mooney viscosity version of ZSC 2295CX |
| ZSC 2395 | 36 | 60-80 | 1.20 | 85 | 57 | Zetpol 2030L modified with zinc methyacrylate |

[1]Based on Zetpol

Non-Functionalized Plasticizer

The polymer compositions of the present invention include at least one non-functionalized plasticizer (NFP). The classes of materials described herein that are useful as non-functionalized plasticizers can be utilized alone or admixed with other NFPs described herein in order to obtain desired properties.

A NFP is a hydrocarbon liquid, that is a liquid compound comprising carbon and hydrogen, which does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent," it is meant that these groups and compounds comprising these groups are not deliberately added to the NFP, and if present at all, are present at less than 5 wt %, based on the weight of the NFP, in one embodiment, more preferably less than 4 wt %, more preferably less than 3 wt %, more preferably less than 2 wt %, more preferably less than 1 wt %, more preferably less than 0.7 wt %, more preferably less than 0.5 wt %, more preferably less than 0.3 wt %, more preferably less than 0.1 wt %, more preferably less than 0.05 wt %, more preferably less than 0.01 wt %, more preferably less than 0.001 wt %, most preferably at 0 wt %, based upon the weight of the NFP.

In one embodiment, aromatic moieties (including any compound whose molecules have the ring structure characteristic of benzene, naphthalene, phenanthrene, anthracene, etc.) are substantially absent from the NFP. By "substantially absent," it is meant that these compounds are not added deliberately to the compositions and, if present at all, are present at less than 0.5 wt % (preferably less than 0.1 wt %, preferably at 0 wt %, based upon the weight of the NFP).

In another embodiment, naphthenic moieties (including any compound whose molecules have a saturated ring structure such as would be produced by hydrogenating benzene, naphthalene, phenanthrene, anthracene, etc.) are substantially absent from the NFP. By "substantially absent," it is meant that these compounds are not added deliberately to the compositions and, if present at all, are present at less than 0.5 wt % (preferably less than 0.1 wt %, preferably at 0 wt %, based upon the weight of the NFP).

In another embodiment, the NFP is a hydrocarbon that does not contain olefinic unsaturation to an appreciable extent. By "appreciable extent of olefinic unsaturation," it is meant that the carbons involved in olefinic bonds account for less than 10% (preferably less than 8%, more preferably less than 6%, more preferably less than 4%, more preferably less than 2%, more preferably less than 1%, more preferably less than 0.7%, more preferably less than 0.5%, more preferably less than 0.3%, more preferably less than 0.1%, more preferably less than 0.05%, more preferably less than 0.01%, more preferably less than 0.001%) of the total number of carbons. In some embodiments, the percent of carbons of the NFP involved in olefinic bonds is between 0.001% and 10% of the total number of carbon atoms in the NFP (preferably between 0.01% and 5%, preferably between 0.1% and 2%, more preferably less than 1%).

Particularly preferred NFPs include PAOs, Group III basestocks or mineral oils, high purity hydrocarbon fluids derived from a so-called Gas-To-Liquids processes, and mineral oils with a viscosity index (ASTM D 2270) greater than 100, pour point (ASTM D 97) less than −20° C., specific gravity less than 0.86 (ASTM D 4052 (15.6/15.6° C.)), and flash point (ASTM D 92) greater than 200° C.

In another embodiment, the NFP comprises $C_6$ to $C_{200}$ paraffins, and $C_8$ to $C_{100}$ paraffins in another embodiment. In another embodiment, the NFP consists essentially of $C_6$ to $C_{200}$ paraffins, or essentially of $C_8$ to $C_{100}$ paraffins in another embodiment. In yet another embodiment, the NFP comprises $C_{20}$ to $C_{1500}$ paraffins, preferably $C_{25}$ to $C_{500}$ paraffins, preferably $C_{25}$ to $C_{500}$ paraffins, preferably NFP-40 to $C_{500}$ paraffins, preferably $C_{40}$ to $C_{500}$ paraffins, preferably $C_{40}$ to $C_{250}$ paraffins, preferably NFP-40 to $C_{150}$ paraffins, preferably $C_{20}$ to $C_{100}$ paraffins. In a preferred embodiment, the NFP comprises oligomers of $C_5$ to $C_{24}$ olefins.

In one embodiment of the present invention, the NFP or blend of NFPs has a number average molecular weight of from 100 to 20,000 g/mol (preferably 300 to 15,000 g/mol, preferably 400 to 10,000 g/mol, preferably 500 to 5,000 g/mol, preferably 600 to 3,000 g/mol, preferably 600 to 1,500 g/mol). Alternately the NFP or NFP blend has a Mn of 1,000 g/mol or more, alternately 1,200 g/mol or more. The number-average molecular weight ($M_n$) of an NFP is determined by one of two methods: 1) for samples having a kinematic viscosity at 100° C. of 10 cSt or less use Gas Chromatography (GC) with a mass spectrometer detector, as generally described in R. L. Grob and E. F. Barry, MODERN PRACTICE OF GAS CHROMATOGRAPHY (Wiley-Interscience, 3d ed., July 1995); or 2) for samples having a kinematic viscosity at 100° C. of more than 10 cSt use Gel Permeation Chromatography (GPC) using polystyrene standards, as generally described in W. W. Yan, J. J. Kirkland, and D. D. Bly, MODERN SIZE EXCLUSION LIQUID CHROMATOGRAPHS (J. Wiley & Sons 1979).

Polyalphaolefins

In another embodiment of the present invention, the NFP comprises a polyalphaolefin (PAO) liquid with a pour point (ASTM D 97) of −10° C. or less and a kinematic viscosity (ASTM D 445) at 100° C. of 3 cSt or more. PAO liquids are described in, for example, U.S. Pat. Nos. 3,149,178; 4,827,064; 4,827,073; 5,171,908; and 5,783,531 and in SYNTHETIC LUBRICANTS AND HIGH-PERFORMANCE FUNCTIONAL FLUIDS (Leslie R. Rudnick & Ronald L. Shubkin, ed. Marcel Dekker, Inc. 1999), pp. 3-52.

PAO liquids may be conveniently prepared by the oligomerization of an alpha-olefin in the presence of a polymerization catalyst, such as a Friedel-Crafts catalyst (including, for example, $AlCl_3$, $BF_3$, and complexes of $BF_3$ with water, alcohols, carboxylic acids, or esters), a coordination complex catalyst (including, for example, the ethylaluminum sesquichloride+$TiCl_4$ system), or a homogeneous or heterogeneous (supported) catalyst more commonly used to make polyethylene and/or polypropylene (including, for example, Ziegler-Natta catalysts, metallocene or other single-site catalysts, and chromium catalysts).

In one embodiment, the PAO comprises $C_{20}$ to $C_{1500}$ (preferably NFP-40 to $C_{800}$, more preferably $C_{35}$ to $C_{400}$, most preferably $C_{40}$ to $C_{250}$) oligomers of alpha-olefins. These oligomers are dimers, trimers, tetramers, pentamers, etc., of $C_3$ to $C_{24}$ (preferably $C_5$ to $C_{18}$, preferably $C_6$ to $C_{14}$, more preferably $C_8$ to $C_{12}$, and especially preferably $C_{10}$) branched or linear alpha-olefins, provided that $C_3$ and $C_4$ alpha-olefins are present at 10 wt % or less. In another embodiment, the PAO comprises $C_3$ to $C_{24}$ (preferably $C_5$ to $C_{18}$, more preferably $C_6$ to $C_{14}$, and especially preferably $C_8$ to $C_{12}$) linear alpha-olefins (LAOs), provided that $C_3$ and $C_4$ LAOs are present at 10 wt % or less. Suitable olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Oligomers of LAOs with only even carbon numbers between 6 and 18 (inclusive) are particularly preferred.

In one embodiment, a single LAO is used to prepare the oligomers. In this case, a preferred embodiment involves the oligomerization of 1-decene, and the PAO is a mixture of oligomers (including, for example, dimers, trimers, tetramers, pentamers, and higher) of 1-decene. In another embodiment, the PAO comprises oligomers of two or more $C_3$ to $C_{18}$ LAOS, to make 'bipolymer' or 'terpolymer' or higher-order copolymer combinations, provided that $C_3$ and $C_4$ LAOs are present at 10 wt % or less. In this case, a preferred embodiment involves the oligomerization of a mixture of 1-octene, 1-decene, and 1-dodecene, and the PAO is a mixture of oligomers (for example, dimers, trimers, tetramers, pentamers, and higher) of 1-octene/1-decene/1-dodecene 'terpolymer'.

In another embodiment, the PAO comprises oligomers of a single alpha-olefin species having a carbon number of 5 to 24 (preferably 6 to 18, more preferably 8 to 12, and especially preferably 10). In another embodiment, the NFP comprises oligomers of mixed alpha-olefins (i.e., involving two or more alpha-olefin species), each alpha-olefin having a carbon number of 3 to 24 (preferably 5 to 24, more preferably 6 to 18, and especially preferably 8 to 12), provided that alpha-olefins having a carbon number of 3 or 4 are present at 10 wt % or less. In a particularly preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, and more preferably 9 to 11).

In another embodiment, the PAO comprises oligomers of one or more alpha-olefin with repeat unit formulas of: —[CHR—$CH_2$]— where R is a $C_3$ to $C_{18}$ saturated hydrocarbon branch. In a preferred embodiment, R is constant for all oligomers. In another embodiment, there is a range of R substituents covering carbon numbers from 3 to 18. Preferably, R is linear, i.e., R is $(CH_2)_n CH_3$, where n is 3 to 17 (preferably 4 to 11, and more preferably 5 to 9). Optionally, R may contain one methyl or ethyl branch, i.e., R is $(CH_2)_m[CH(CH_3)](CH_2)_z CH_3$ or R is $(CH_2)_x[CH(CH_2CH_3)](CH_2)_y CH_3$, where (m+z) is 1 to 15 (preferably 1 to 9, preferably 3 to 7), and (x+y) is 1 to 14, preferably 1 to 8, preferably 2 to 6). Preferably m>z; more preferably m is 0 to 15, more preferably 2 to 15, more preferably 3 to 12, more preferably 4 to 9; and n is 0 to 10, preferably 1 to 8, preferably 1 to 6, preferably 1 to 4. Preferably x>y; more preferably x is 0 to 14, more preferably 1 to 14, more preferably 2 to 11, more preferably 3 to 8; and y is 0 to 10, preferably 1 to 8, preferably 1 to 6, preferably 1 to 4. Preferably, the repeat units are arranged in a head-to-tail fashion with minimal heat-to-head connections.

The PAO may be atactic, isotactic, or syndiotactic. In one embodiment, the PAO has essentially the same population of meso and racemic dyads, on average, making it atactic. In another embodiment, the PAO has more than 50% (preferably more than 60%, preferably more than 70%, preferably more than 80%, preferably more than 90%) meso dyads (i.e., [m]) as measured by $^{13}$C-NMR. In another embodiment, the PAO has more than 50% (preferably more than 60%, preferably more than 70%, preferably more than 80%, preferably more than 90%) racemic dyads (i.e., [r]) as measured by $^{13}$C-NMR. In one embodiment, [m]/[r] determined by $^{13}$C-NMR is between 0.9 and 1.1 in one embodiment, [m]/[r] is greater than 1 in another embodiment, and [m]/[r] is less than 1 in yet another embodiment.

The PAO liquid may be comprised of one or more distinct PAO components. In one embodiment, the NFP is a blend of one or more PAOs with different compositions (e.g., different alpha-olefin(s) were used to make the oligomers) and/or different physical properties (e.g., kinematic viscosity, pour point, viscosity index, and/or glass transition temperature). In a preferred embodiment, the kinematic viscosity at 100° C. ($KV_{100}$) of a first PAO is at least 1.5 times the $KV_{100}$ of a second PAO in a blend, alternately 3 times, alternately 5 times, alternately 10 times, alternately 20 times, alternately 50 times, alternately 100 times.

In one embodiment of the present invention, the PAO or blend of PAOs has a number average molecular weight of from 100 to 20,000 g/mol (preferably 300 to 15,000 g/mol, preferably 400 to 10,000 g/mol, preferably 500 to 5,000 g/mol, preferably 600 to 3,000 g/mol, preferably 600 to 1,500 g/mol). Alternately the PAO or PAO blend has a Mn of 1,000 g/mol or more, alternately 1,200 g/mol or more.

In a preferred embodiment, the PAO or blend of PAOs has a kinematic viscosity (ASTM D 445) at 100° C. of 3 cSt or more (preferably 5 cSt or more, preferably 6 cSt or more, preferably 8 cSt or more, preferably 10 cSt or more, preferably 20 cSt or more, preferably 30 cSt or more, preferably 40 cSt or more, preferably 100 or more, preferably 150 cSt or more). In another embodiment, the PAO or blend of PAOs has a kinematic viscosity (ASTM D 445) at 100° C. of 300 cSt or less (preferably 100 cSt or less). In another embodiment, the PAO has a kinematic viscosity (ASTM D 445) at 100° C. of 3 to 3,000 cSt (preferably 4 to 1,000 cSt, preferably 6 to 300 cSt, preferably 8 to 150 cSt, preferably 8 to 100 cSt, preferably 8 to 40 cSt). In another embodiment, the PAO or blend of PAOs has a kinematic viscosity (ASTM D 445) at 100° C. of 10 to 1000 cSt (preferably 10 to 300 cSt, and more preferably 10 to 100 cSt). In yet another embodiment, the PAO or blend of PAOs has a kinematic viscosity (ASTM D 445) at 100° C. of about 4 to 8 cSt.

In another preferred embodiment, the PAO or blend of PAOs has a viscosity index (ASTM D 2270) of 120 or more (preferably 130 or more, preferably 140 or more, preferably 150 or more, preferably 170 or more, preferably 190 or more, preferably 200 or more, preferably 250 or more, preferably 300 or more). In another embodiment, the PAO or blend of PAOs has a viscosity index (ASTM D 2270) of 120 to 350 (preferably 130 to 250).

In yet another preferred embodiment, the PAO or blend of PAOs has a pour point (ASTM D 97) of 10° C. or less (preferably 20° C. or less, preferably 25° C. or less, preferably 30° C. or less, preferably 35° C. or less, preferably 40° C. or less, preferably 50° C. or less). In another embodiment, the PAO or blend of PAOs has a pour point (ASTM D 97) of −15° C. to −70° C. (preferably −25° C. to −60° C.).

In yet another preferred embodiment, the PAO or blend of PAOs has a glass transition temperature (Tg) of 40° C. or less (preferably 50° C. or less, preferably 60° C. or less, preferably 70° C. or less, preferably 80° C. or less). In another embodiment, the PAO or blend of PAOs has a Tg of 50° C. to 120° C. (preferably 60° C. to 100° C., and more preferably 70° C. to 90° C.).

In yet another preferred embodiment, the PAO or blend of PAOs has a flash point (ASTM D 92) of 200° C. or more (preferably 210° C. or more, preferably 220° C. or more, preferably 230° C. or more), or preferably between 240° C. and 290° C.

In yet another preferred embodiment, the PAO or blend of PAOs has a specific gravity (15.6/15.6° C.) of 0.86 or less (preferably 0.855 or less, more preferably 0.85 or less, and especially preferably 0.84 or less).

Particularly preferred PAOs and blends of PAOs are those having 1) a flash point (ASTM D 92) of 200° C. or more (preferably 210° C. or more, more preferably 220° C. or more, and especially preferably 230° C. or more); 2a) a pour point (ASTM D 97) less than −20° C. (preferably less than −25° C., preferably less than −30° C., more preferably less than −35° C., and especially preferably less than −40° C.); and/or 2b) a kinematic viscosity (ASTM D 445) at 100° C. of 10 cSt or more (preferably 35 cSt or more, more preferably 40 cSt or more, and especially preferably 50 cSt or more).

Further preferred PAOs or blends of PAOs have a kinematic viscosity (ASTM D 445) at 100° C. of at least 3 cSt (preferably at least 6 cSt, more preferably at least 8 cSt, most preferably at least 10 cSt); a viscosity index (ASTM D 2270) of at least 120 (preferably at least 130, more preferably at least 140, most preferably at least 150); a pour point (ASTM D 97) of 10° C. or less (preferably 20° C. or less, more preferably −30° C. or less, most preferably 40° C. or less); and a specific gravity (ASTM D 4052, 15.6/15.6° C.) of 0.86 or less (preferably 0.855 or less, more preferably 0.85 or less, most preferably 0.84 or less).

Desirable PAOs are commercially available as SpectraSyn™ and SpectraSyn Ultra™ from ExxonMobil Chemical in Houston, Tex. (previously sold under the SuperSyn™ trade name by ExxonMobil Chemical Company), some of which are summarized in Table 5. Other useful PAOs include those sold under the trade names Synfluid™ available from ChevronPhillips Chemical Company (Pasadena, Tex.), Durasyn™ available from Innovene (Chicago, Ill.), Nexbase™ available from Neste Oil (Keilaniemi, Finland), and Synton™ available from Chemtura Corporation (Middlebury, Conn.). For PAOs, the percentage of carbons in chain-type paraffinic structures (CP) is close to 100% (typically greater than 98% or even 99%).

TABLE 5

SpectraSyn ™ Series Polyalphaolefins

| | KV100, cSt | KV40, cSt | VI | Pour Point, ° C. | Specific gravity | Flash Point, ° C. | APHA Color |
|---|---|---|---|---|---|---|---|
| SpectraSyn 4 | 4 | 19 | 126 | −66 | 0.820 | 220 | 10 |
| SpectraSyn Plus 4 | 4 | 17 | 122 | −60 | 0.820 | 228 | 10 |
| SpectraSyn 6 | 6 | 31 | 138 | −57 | 0.827 | 246 | 10 |
| SpectraSyn Plus 6 | 6 | 30 | 140 | −54 | 0.827 | 246 | 10 |
| SpectraSyn 8 | 8 | 48 | 139 | −48 | 0.833 | 260 | 10 |
| SpectraSyn 10 | 10 | 66 | 137 | −48 | 0.835 | 266 | 10 |
| SpectraSyn 40 | 39 | 396 | 147 | −42 | 0.850 | 286 | 10 |
| SpectraSyn 100 | 100 | 1,240 | 170 | −30 | 0.853 | 283 | 60 |
| SpectraSyn Ultra 150 | 150 | 1,500 | 218 | −33 | 0.850 | >265 | 10 |
| SpectraSyn Ultra 300 | 300 | 3,100 | 241 | −27 | 0.852 | >265 | 20 |
| SpectraSyn Ultra 1000 | 1,000 | 10,000 | 307 | −18 | 0.855 | >265 | 30 |

High Purity Hydrocarbon Fluids

In another embodiment, the non-functionalized plasticizer (NFP) is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant basestock or oil, which includes:

1. hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and
2. hydroisomerized synthetic waxes, such as Fischer-Tropsch waxes (i.e., the high boiling point residues of Fischer-Tropsch synthesis, including waxy hydrocarbons); or mixtures thereof. Most preferred are lubricant basestocks or oils derived from hydrocarbons synthesized in a Fischer-Tropsch process as part of an overall Gas-to-Liquids (GTL) process.

In one embodiment, the mixture of paraffins has:

1. a naphthenic content of less than 40 wt %, based on the total weight of the hydrocarbon mixture, (preferably less than 30 wt %, preferably less than 20 wt %, preferably less than 15 wt %, preferably less than 10 wt %, preferably less than 5 wt %, more preferably less than 2 wt %, and especially preferably less than 1 wt %); and/or
2. a normal paraffins content of less than 5 wt %, based on the total weight of the hydrocarbon mixture, (preferably less than 4 wt %, more preferably less than 3 wt %, and especially preferably less than 1 wt %); and/or
3. an aromatic content of 1 wt % or less (preferably 0.5 wt % or less); and/or
4. a saturates level of 90 wt % or higher (preferably 95 wt % or higher, more preferably 98 wt % or higher, and especially preferably 99 wt % or higher); and/or
5. the percentage of carbons in chain-type paraffinic structures (CP) of 80% or more (preferably 90% or more, more preferably 95% or more, and especially preferably 98% or more); and/or
6. a branched paraffin: normal paraffin ratio greater than about 10:1 (preferably greater than 20:1, preferably greater than 50:1, preferably greater than 100:1, preferably greater than 500:1, preferably greater than 1000:1); and/or
7. sidechains with 4 or more carbons making up less than 10% of all sidechains (preferably less than 5%, and more preferably less than 1%); and/or
8. sidechains with 1 or 2 carbons making up at least 50% of all sidechains (preferably at least 60%, preferably at least 70%, preferably at least 80%, preferably at least 90%, preferably at least 95%, preferably at least 98%); and/or
9. a sulfur content (ASTM D 2622) of 300 ppm or less, where ppm is on a weight basis, (preferably 100 ppm or less, more preferably 50 ppm or less, and especially preferably 10 ppm or less); and/or
10. a nitrogen content (ASTM D 4629) of 300 ppm or less, where ppm is on a weight basis, (preferably 100 ppm or less, more preferably 50 ppm or less, and especially preferably 10 ppm or less).
11. a number-average molecular weight of 300 to 1800 g/mol (preferably 400 to 1500 g/mol, more preferably 500 to 1200 g/mol, and especially preferably 600 to 900 g/mol); and/or
12. a kinematic viscosity (ASTM D 445) at 40° C. of 10 cSt or more (preferably 25 cSt or more, preferably between about 50 and 400 cSt); and/or
13. a kinematic viscosity (ASTM D 445) at 100° C. ranging from 2 to 50 cSt (preferably 3 to 30 cSt, preferably 5 to 25 cSt, preferably 6 to 20 cSt, more preferably 8 to 16 cSt); and/or
14. a viscosity index (ASTM D 2270) of 80 or greater (preferably 100 or greater, preferably 120 or greater, preferably 130 or greater, preferably 140 or greater, preferably 150 or greater, preferably 160 or greater, preferably 180 or greater); and/or 15. a pour point (ASTM D 97) of −5° C. or lower (preferably 10° C. or lower, preferably 15° C. or lower, preferably 20° C. or lower, more preferably 25° C. or lower, and especially preferably 30° C. or lower); and/or 16. a flash point (ASTM D 92) of 200° C. or more (preferably 220° C. or more, more preferably 240° C. or more, and especially preferably 260° C. or more); and/or 17. a specific gravity (ASTM D 4052, 15.6/15.6° C.) of 0.86 or less (preferably 0.85 or less, preferably 0.84 or less); and/or 18. an aniline point (ASTM D 611) of 120° C. or more; and/or 19. a bromine number (ASTM D 1159 or ASTM D 2710 if so directed by ASTM D 1159) of 1 or less.

Carbon type composition is determined by ASTM D 2140, and gives the percentage of aromatic carbons ($C_A$), naphthenic carbons ($C_N$), and paraffinic carbons ($C_P$) in the fluid. Specifically, $C_A$ is the wt % of total carbon atoms in the fluid that are in aromatic ring-type structures; $C_N$ is the wt % of total carbon atoms in the fluid that are in saturated ring-type structures; and $C_P$ is the wt % of total carbon atoms in the fluid that are in paraffinic chain-type structures. ASTM D 2140 involves calculating a "Viscosity Gravity Constant" (VGC) and "Refractivity Intercept" (RI) for the fluid, and determining the carbon type composition from a correlation based on these two values. However, this method is known to fail for highly paraffinic oils, because the VGC and RI values fall outside the correlation range. Therefore, for purposes of this invention, the following protocol is used: if the calculated VGC (ASTM D 2140) for a fluid is 0.800 or greater, the carbon type composition including $C_P$ is determined by ASTM D 2140; if the calculated VGC (ASTM D 2140) is less than 0.800, the fluid is considered to have $C_P$ of at least 80%; if the calculated VGC (ASTM D 2140) is less than 0.800 but greater than 0.765, then ASTM D 3238 is used to determine the carbon type composition including $C_P$; if application of ASTM D 3238 yields unphysical quantities (e.g., a negative $C_A$ value), then $C_P$ is defined to be 100%; if the calculated VGC (ASTM D 2140) for a fluid is 0.765 or less, then $C_P$ is defined to be 100%. Carbon Type Composition ($C_A$, $C_N$, $C_P$) is determined as described above, referring to ASTM D 2140 if necessary. Saturates content is determined according to ASTM 2007. Sulfur content is determined according to ASTM D 2622. Nitrogen content is determined according to ASTM D4629. Bromine Number is determined according to ASTM D 1159 (or ASTM D 2710 if so directed by ASTM D 1159).

In a preferred embodiment, the mixture of paraffins comprises a GTL basestock or oil. GTL basestocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and $H_2$) derived from a suitable source, such as natural gas and/or coal. GTL basestocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL basestocks and oils may further comprise other hydroisomerized basestocks and base oils. Particularly preferred GTL basestocks or oils are those comprising mostly hydroisomerized F-T waxes and/or other liquid hydrocarbons obtained by a F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant basestock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc., on a suitable oxide support material, or a crystalline catalyst, for example, a zeolitic catalyst such as ZSM-23 and ZSM-48 and others disclosed in U.S. Pat. No. 4,906,350, often used in conjunction with a Group VIII metal, such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL basestocks and oils, Fischer-Tropsch hydrocarbon derived basestocks and oils, and wax isomerate hydroisomerized basestocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents EP 324528; EP 532116; EP 532118; EP 537815; EP 583836; EP 666894; EP 668342; EP 776959; WO Patent Applications WO 97/31693; WO 99/20720; WO 99/45085; WO 02/64710; WO 02/64711; WO 02/70627; WO 02/70629; WO 03/33320; and British Patents 1,350,257; 1,390,359; 1,429,494; and 1,440,230. Particularly favorable processes are described in European Patent Applications EP 464546 and EP 464547. Processes using Fischer-Tropsch wax feeds are described in U.S. Pat. Nos. 4,594,172; 4,943,672; 6,046,940; 6,103,099; 6,332,974; 6,375,830; and 6,475,960.

Desirable GTL-derived fluids are expected to become broadly available from several commercial sources, including Chevron, ConocoPhillips, ExxonMobil, Sasol, SasolChevron, Shell, Statoil, and Syntroleum.

This invention also relates to plasticized polyolefin compositions comprising one or more polyolefins and one or more non-functionalized plasticizers, where one or more NFP is a high purity hydrocarbon fluid derived from a GTL process comprising a mixture of paraffins of carbon number ranging from about $C_{20}$ to $C_{100}$, a molar ratio of isoparaffins: n-paraffins greater than about 50:1, the percentage of carbons in paraffinic structures (CP) of 98% or more, a pour point (ASTM D 97) ranging from about −20° C. to −60° C., and a kinematic viscosity (ASTM D 445) at 100° C. ranging from about 6 to 20 cSt.

preferably 6 to 30 cSt, and especially preferably 8 to 20); and/or a number average molecular weight of 300 to 5,000 g/mol (preferably 400 to 2,000 g/mol, and more preferably 500 to 1,000 g/mol). Preferably the Group III hydrocarbon oil has a pour point (ASTM D 97) of 10° C. or less, a flash point (ASTM D 92) of 200° C. or more, and a specific gravity (ASTM D 4052, 15.6° C./15.6° C.) of 0.86 or less.

Desirable Group III basestocks are commercially available from a number of sources, and include those described in Table 6. The percentage of carbons in chain-type paraffinic structures (CP) in such liquids is greater than 80%.

TABLE 6

Commercially Available Group III Basestocks

| | Kinematic Viscosity At 100° C., cSt | Viscosity Index | Pour Point, ° C. | Specific gravity | Flash Point, ° C. |
|---|---|---|---|---|---|
| UCBO 4R[1] | 4.1 | 127 | −18 | 0.826 | 216 |
| UCBO 7R[1] | 7.0 | 135 | −18 | 0.839 | 250 |
| Nexbase 3043[2] | 4.3 | 124 | −18 | 0.831 | 224 |
| Nexbase 3050[2] | 5.1 | 126 | −15 | 0.835 | 240 |
| Nexbase 3060[2] | 6.0 | 128 | −15 | 0.838 | 240 |
| Nexbase 3080[2] | 8.0 | 128 | −15 | 0.843 | 260 |
| Yubase YU-4[3] | 4.2 | 122 | −15 | 0.843 | 230 |
| Yubase YU-6[3] | 6.5 | 131 | −15 | 0.842 | 240 |
| Yubase YU-8[3] | 7.6 | 128 | −12 | 0.850 | 260 |
| Ultra-S 4[4] | 4.3 | 123 | −20 | 0.836 | 220 |
| Ultra-S 6[4] | 5.6 | 128 | −20 | 0.839 | 234 |
| Ultra-S 8[4] | 7.2 | 127 | −15 | 0.847 | 256 |
| VHVI 4[5] | 4.6 | 128 | −21 | 0.826 | |
| VHVI 8[5] | 8.0 | 127 | −12 | 0.850 | 248 |
| Visom 4[6] | 4.0 | N/A | N/A | N/A | 210 |
| Visom 6[6] | 6.6 | 148 | −18 | 0.836 | 250 |

[1]Available from ChevronTexaco (USA).
[2]Available from Neste Oil (Finland).
[3]Available from SK Corp (South Korea).
[4]Available from ConocoPhillips (USA)/S-Oil (South Korea).
[5]Available from PetroCanada (Canada).
[6]Available from ExxonMobil (USA).

As used herein, the following terms have the indicated meanings "naphthenic" describes cyclic (mono-ring and/or multi-ring) saturated hydrocarbons (i.e., cycloparaffins) and branched cyclic saturated hydrocarbons; "aromatic" describes cyclic (mono-ring and/or multi-ring) unsaturated hydrocarbons and branched cyclic unsaturated hydrocarbons; "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

Group III Basestocks or Mineral Oils

In another embodiment, the NFP comprises a Group III hydrocarbon oil (also called a Group III lubricant basestock or Group III mineral oil). Preferably the NFP has a saturates level of 90% or more (preferably 92% or more, preferably 94% or more, preferably 95% or more, preferably 98% or more); and a sulfur content (ASTM D 2622) less than 0.03% (preferably between 0.001% and 0.01%); and a viscosity index of 120 or more (preferably 130 or more). Preferably the Group III hydrocarbon oil has a kinematic viscosity (ASTM D 445) at 100° C. of 3 to 50 (preferably 4 to 40 cSt, more General Characteristics of Useful NFPs The NFP's described herein may be used alone or as a blend of NFPs. Useful blends of NFPs include blends of two or more NFPs where the ratio of the highest kinematic viscosity at 100° C. (KV100) to the lowest KV100 is at least 1.5 (preferably at least 2, preferably at least 3, preferably at least 5). Preferred blends of NFPs include blends of two or more PAOs where the ratio of the highest KV100 to the lowest KV100 is at least 1.5 (preferably at least 2, preferably at least 3, preferably at least 5, alternately at lest 10, alternately at least 20, alternately at least 50, alternately at least 100).

In preferred embodiments, the NFP has a kinematic viscosity (ASTM D 445) at 100° C. (KV100) of 4 cSt or more (preferably 5 cSt or more, preferably 6 to 5000 cSt, preferably 8 to 3000 cSt, preferably 10 to 1000 cSt, preferably 12 to 500 cSt, preferably 15 to 350 cSt, preferably 35 to 300 cSt, preferably 40 to 200 cSt, preferably 8 to 300 cSt, preferably 6 to 150 cSt, preferably 10 to 100 cSt, preferably less than 50 cSt), wherein a desirable range may be any combination of any lower KV100 limit with any upper KV100 limit described herein. In other embodiments, the NFP has a kinematic viscosity (ASTM D 445) at 100° C. of less than 2 cSt.

In preferred embodiments, the NFP has a pour point (ASTM D 97) of 10° C. or less (preferably 20° C. or less, preferably 30° C. or less, preferably 40° C. or less, preferably 45° C. or less, preferably 50° C. or less, preferably 10° C. to 100° C., preferably 15° C. to 80° C., preferably 15° C. to 75°

C., preferably 20° C. to 70° C., preferably 25° C. to 65° C., preferably greater than 120° C.), wherein a desirable range may be any combination of any lower pour point limit with any upper pour point limit described herein. In another embodiment, the NFP has a pour point (ASTM D 97) of less than 30° C. when the kinematic viscosity (ASTM D 445) at 40° C. is from 0.5 to 200 cSt. Most mineral oils, which typically include aromatic moieties and other functional groups, have a pour point (ASTM D 97) of from 10° C. to 20° C. in the same kinematic viscosity range.

In a preferred embodiment, the NFP has a glass transition temperature (Tg) (ASTM E 1356) of 40° C. or less (preferably 50° C. or less, preferably 60° C. or less, preferably 70° C. or less, preferably 80° C. or less, preferably −45° C. to −120° C., preferably −65° C. to −90° C.), wherein a desirable range may be any combination of any lower Tg limit with any upper Tg limit described herein.

In preferred embodiments, the NFP has a viscosity index (ASTM D 2270) of 90 or more (preferably 100 or more, preferably 110 or more, preferably 120 or more, preferably 130 or more, preferably 115 to 350, preferably 135 to 300, preferably 140 to 250, preferably 150 to 200, preferably 125 to 180), wherein a desirable range may be any combination of any lower viscosity index limit with any upper viscosity index limit described herein.

In preferred embodiments, the NFP has a flash point (ASTM D 92) of 200° C. or greater (preferably 210° C. or greater, preferably 230° C. or greater, preferably 200° C. to 350° C., preferably 210° C. to 300° C., preferably 215° C. to 290° C., preferably 220° C. to 280° C., preferably 240° C. to 280° C.), wherein a desirable range may be any combination of any lower flash point limit with any upper flash point limit described herein.

In preferred embodiments, the NFP has a specific gravity (ASTM D 4052, 15.6/15.6° C.) of 0.86 or less (preferably 0.855 or less, preferably 0.84 or less, preferably 0.78 to 0.86, preferably 0.79 to 0.855, preferably 0.80 to 0.85, preferably 0.81 to 0.845, preferably 0.82 to 0.84), wherein a desirable range may be any combination of any lower specific gravity limit with any upper specific gravity limit described herein.

In preferred embodiments, the NFP has a number-average molecular weight (Mn) of 250 g/mol or more (preferably 300 g/mol or more, preferably 500 g/mol or more, preferably 300 to 21,000 g/mol, preferably 300 to 10,000 g/mol, preferably 400 to 5,000 g/mol, preferably 500 to 3,000 g/mol, preferably 1200 to 3000 g/mol, preferably 10 kg/mol or less, preferably 5 kg/mol or less, preferably 3 kg/mol or less, preferably 2 kg/mol or less, preferably 1 kg/mol or less), wherein a desirable range may be any combination of any lower Mn limit with any upper Mn limit described herein.

In preferred embodiments, the NFP has a low degree of color, such as typically identified as "water white," "prime white," "standard white," or "bright and clear," preferably an APHA color (ASTM D 1209) of 100 or less (preferably 80 or less, preferably 60 or less, preferably 40 or less, preferably 20 or less).

In other embodiments, any NFP may have an initial boiling point (ASTM D 1160) of from 300° C. to 600° C. in one embodiment, and from 350° C. to 500° C. in another embodiment, and greater than 400° C. in yet another embodiment.

Any of the NFPs for use in the present invention may be described by any embodiment described herein, or any combination of the embodiments described herein. For example, in one embodiment, the NFP is a $C_6$ to $C_{200}$ paraffin having a pour point (ASTM D 97) of less than −25° C. Alternatively, the NFP comprises an aliphatic hydrocarbon having a kinematic viscosity (ASTM D 445) of from 0.1 to 1000 cSt at 100° C. Alternatively, the NFP is selected from isoparaffins and PAOs and blends thereof having from 8 to 25 carbon atoms.

In another embodiment, the NFP of the present invention comprises $C_{25}$ to $C_{1500}$ paraffins, and NFP-40 to $C_{500}$ paraffins in another embodiment, and has a flash point (ASTM D 92) of 200° C. or more and a pour point (ASTM D 97) of −10° C. or less and a viscosity index (ASTM D 2270) of 120 or more. Alternately the NFP comprises $C_{25}$ to $C_{1500}$ paraffins, preferably NFP-40 to $C_{500}$ paraffins, and has a flash point (ASTM D 92) of 200° C. or more and a pour point (ASTM D 97) of 20° C. or less. Alternately the NFP comprises $C_{25}$ to $C_{1500}$ paraffins, preferably NFP-40 to $C_{500}$ paraffins, and has a flash point (ASTM D 92) of 200° C. or more and a kinematic viscosity (ASTM D 445) at 100° C. of 35 cSt or more. In another embodiment, the NFP consists essentially of $C_{35}$ to NFP-40$_0$ paraffins, preferably the NFP consists essentially of $C_{40}$ to $C_{250}$ paraffins, and has a flash point (ASTM D 92) of 200° C. or more and a pour point (ASTM D 97) of 10° C. or less and a viscosity index (ASTM D 2270) of 120 or more. Alternately the NFP consists essentially of $C_{35}$ to NFP-40$_0$ paraffins, preferably $C_{40}$ to $C_{250}$ paraffins, and has a flash point (ASTM D 92) of 200° C. or more and a pour point (ASTM D 97) of −20° C. or less. Alternately the NFP consists essentially of $C_{35}$ to NFP-40$_0$ paraffins, preferably $C_{40}$ to $C_{250}$ paraffins, and has a flash point (ASTM D 92) of 200° C. or more and a kinematic viscosity (ASTM D 445) at 100° C. of 35 cSt or more. Alternately the NFP has a flash point (ASTM D 92) of 200° C. or more and a pour point (ASTM D 97) of −20° C. or less. Alternately the NFP has a flash point (ASTM D 92) of 200° C. or more and a kinematic viscosity (ASTM D 445) at 100° C. of 35 cSt or more.

In a preferred embodiment, any NFP described herein has a flash point (ASTM D 92) of 200° C. or more (preferably 210° C. or more) and a pour point (ASTM D 97) of 20° C. or less, (preferably 25° C. or less, preferably 30° C. or less, preferably 35° C. or less, preferably 45° C. or less, preferably 50° C. or less).

In another preferred embodiment, the NFP has a flash point (ASTM D 92) of 220° C. or more (preferably 230° C. or more) and a pour point (ASTM D 97) of 10° C. or less (preferably 25° C. or less, preferably 30° C. or less, preferably 35° C. or less, preferably 45° C. or less, preferably 50° C. or less).

In another preferred embodiment, the NFP has a kinematic viscosity (ASTM D 445) at 100° C. of 35 cSt or more (preferably 40 cSt or more, more preferably 50 cSt or more, and especially preferably 60 cSt or more) and a specific gravity (15.6/15.6° C.) of 0.87 or less (preferably 0.865 or less, more preferably 0.86 or less, and especially preferably 0.855 or less) and a flash point (ASTM D 92) of 200° C. or more (preferably 230° C. or more).

In another preferred embodiment, the NFP has 1) a flash point (ASTM D 92) of 200° C. or more; 2) a specific gravity of 0.86 or less; and 3a) a pour point (ASTM D 97) of 10° C. or less and a viscosity index (ASTM D 2270) of 120 or more; or 3b) a pour point (ASTM D 97) of 20° C. or less; or 3c) a kinematic viscosity (ASTM D 445) at 100° C. of 35 cSt or more.

In another preferred embodiment the NFP has kinematic viscosity (ASTM D 445) at 100° C. of 3 cSt or greater (preferably 6 cSt or greater, and more preferably 8 cSt or greater), and one or more of the following properties:
1. a pour point (ASTM D 97) of 10° C. or less (preferably 20° C. or less, preferably 30° C. or less, preferably 40° C. or less); and/or,
2. a viscosity index (ASTM D 2270) of 120 or greater; and/or, 3. a low degree of color, such as typically identified as "water white," "prime white," "standard white," or "bright and clear," preferably an APHA color (ASTM D 1209) of 100 or less (preferably 80 or less, preferably 60 or less, preferably 40 or less, preferably 20 or less, preferably 15 or less); and/or
4. a flash point (ASTM D 92) of 200° C. or more (preferably 220° C. or more, and more preferably 240° C. or more); and/or
5. a specific gravity (ASTM D 4052, 15.6/15.6° C.) of less than 0.86.

In another preferred embodiment the NFP has a glass transition temperature (Tg) that cannot be determined by ASTM E 1356 or, if it can be determined, then the Tg according to ASTM E 1356 is less than 0° C. (preferably less than 10° C., preferably less than 20° C., more preferably less than 30° C., and especially more preferably less than 40° C.), and, preferably, also has one or more of the following properties:
1. an initial boiling point (ASTM D 1160) greater than 300° C. (preferably greater than 350° C., and more preferably greater than 400° C.); and/or
2. a pour point (ASTM D 97) of −10° C. or less, preferably 15° C. or less (preferably 25° C. or less, more preferably 35° C. or less, and especially preferably 45° C. or less); and/or
3. a specific gravity (ASTM D 4052, 15.6/15.6° C.) of less than 0.88 (preferably less than 0.86, preferably less than 0.84, preferably from 0.80 to 0.88, preferably from 0.82 to 0.86); and/or
4. a final boiling point (ASTM D 1160) of from 300° C. to 800° C. (preferably from 400° C. to 700° C., and more preferably greater than 500° C.); and/or
5. a weight average molecular weight (Mw) between 30,000 and 400 g/mol (preferably between 15,000 and 500 g/mol, and more preferably between 5,000 and 600 g/mol); and/or
6. a number average molecular weight (Mn) between 10,000 and 400 g/mol (preferably between 5,000 and 500 g/mol, and more preferably between 2,000 and 600 g/mol); and/or
7. a flash point (ASTM D 92) of 200° C. or more (preferably 220° C. or more, and more preferably 240° C. or more).

In certain particularly preferred embodiments, the NFP has a specific gravity of 0.86 or less (preferably 0.855 or less, and more preferably 0.85 or less), and one or more of the following: 1) a viscosity index of 120 or more (preferably 135 or more, and more preferably 140 or more); and/or 2) a flash point (ASTM D 92) of 200° C. or more (preferably 220° C. or more, and more preferably 240° C. or more).

In a preferred embodiment, the percentage of carbons in chain-type paraffins (CP) for any NFP is at least 80% (preferably at least 85%, preferably at least 90%, preferably at least 95%, more preferably at least 98%, especially preferably at least 99%).

Preferred compositions of the present invention can be characterized in that the glass transition temperature (Tg) (or lower Tg, if there are two or more Tg's) of the composition decreases by at least 1° C. for every 1 wt % of NFP present in the composition (preferably at least 2° C., preferably at least 3° C., preferably at least 4° C., preferably at least 5° C., preferably at least 6° C., preferably at least 7° C., preferably at least 8° C., preferably at least 9° C., preferably at least 10° C.), while the peak melting and crystallization temperatures of the polyolefin remain within 5° C. of their values for the unplasticized polyolefin (preferably within 4° C., more preferably within 3° C., and especially preferably within 2° C.).

Preferred compositions of the present invention can be characterized in that the glass transition temperature (Tg) (or lower Tg, if there are two or more Tg's) of the plasticized composition is at least 2° C. lower than that of the unplasticized polyolefin (preferably at least 4° C., preferably at least 6° C., preferably at least 8° C., preferably at least 10° C., preferably at least 12° C., preferably at least 15° C., preferably at least 20° C., more preferably at least 25° C., and especially preferably at least 30° C.), while the peak melting and crystallization temperatures of the polyolefin remain within 5° C. of their values for the unplasticized polyolefin (preferably within 4° C., more preferably within 3° C., and especially preferably within 2° C.).

Preferred compositions of the present invention can be characterized in that the plasticized composition decreases less than 3% in weight (preferably less than 2% in weight, and more preferably less than 1% in weight) when permanence of the NFP is determined by ASTM D 1203 (0.25 mm thick sheet, 300 hours in dry 70° C. oven). Weight loss here refers to the reduction in weight in excess of that measured for the unplasticized composition under the same test conditions.

Preferred NFPs of this invention are characterized in that, when blended with the polyolefin to form a plasticized composition, the NFP is miscible with the polyolefin as indicated by no change in the number of tan-delta peaks in the Dynamic Mechanical Thermal Analysis (DMTA) trace as compared to the unplasticized polyolefin DMTA trace (the "trace" is the plot of tan-delta vs temperature). Lack of miscibility is indicated by an increase in the number of tan-delta peaks in DMTA trace over those in the unplasticized polyolefin.

Dynamic Mechanical Thermal Analysis (DMTA)

The glass transition temperature ($T_g$) is measured using dynamic mechanical thermal analysis (DMTA). This test provides information about the small-strain mechanical response (relaxation behavior) of a sample as a function of temperature over a temperature range that includes the glass transition region and the visco-elastic region prior to melting. Typically, samples are tested using a three point bending configuration (TA Instruments DMA 2980). A solid rectangular compression molded bar is placed on two fixed supports; a movable clamp applied a periodic deformation to the sample midpoint at a frequency of 1 Hz and amplitude of 20 μm. The sample is initially cooled to 130° C. then heated to 60° C. at a heating rate of 3° C./min. In some cases, compression molded bars are tested using other deformation configurations, namely dual cantilever bending and tensile elongation (Rheometrics RSAII). The periodic deformation under these configurations is applied at a frequency of 1 Hz and strain amplitude of 0.05%. The sample is cooled to 130° C. and then heated to 60° C. at a rate of 2° C./min. The slight difference in heating rate does not influence the glass transition temperature measurements significantly. The output of these DMTA experiments is the storage modulus (E') and loss modulus (E"). The storage modulus measures the elastic response or the ability of the material to store energy, and the loss modulus measures the viscous response or the ability of the material to dissipate energy. Tan-delta is the ratio of E"/E' and gives a measure of the damping ability of the material. The beginning of the broad glass transition (β-relaxation) is identified as the extrapolated tangent to the tan-delta peak. In addition, the peak temperature and area under the peak are also measured to more fully characterize the transition from glassy to viscoelastic region. Thus, the glass transition temperature is the peak temperature associated with the β-relaxation peak.

Crystallization temperature ($T_c$), melting temperature ($T_m$), heat of fusion, ($H_f$) upon melting, heat of crystallization ($H_c$) and percent crystallinity are measured using Differential Scanning calorimetry (DSC) as described in US 2008/0045638 pages 36-37.

Fillers and Additives

In one or more embodiments, the polymer compositions may also contain other components and additives customarily used in rubber compounds, such as, for example, effective amounts of other processing aids, pigments, accelerators, cross-linking and curing materials, antioxidants, antiozonants, fillers, and/or clays. In addition to NFP, the polymer composition may optionally include other useful processing aids such as, for example, plastomers, polybutenes, or mixtures thereof.

In one or more embodiments, the polymer composition can include one or more fillers, preferably in the amount of less than 80 wt %, or less than 70 wt %, or less than 60 wt %, or less than 50 wt %, or less than 40 wt %, or less than 30 wt %, or less than 20 wt %, or less than 10 wt %, or in other embodiments, less than 5 wt %, or less than 2 wt %, or less than 1 wt %, based upon the weight of the composition.

Suitable fillers include reinforcing fillers such as carbon black, talc, carbon fibers, or silica, which can improve the mechanical and wear properties of the compositions, as well as non-reinforcing fillers such as calcium carbonate or titanium dioxide. The fillers may be any size and typically are in the range of about 0.0001 μm to about 100 μm.

The fillers may be carbon black, modified carbon black, silica or mixtures thereof. In one embodiment, the elastomeric composition comprises reinforcing grade carbon black at a level in the range of 10 to 100 phr of the blend (preferably in the range of 30 to 80 phr, and more preferable in the range of 50 to 80 phr). Useful grades of carbon black include the ranges of from N110 to N990 (preferably N660).

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

Other suitable fillers include inorganic particulate fillers, conductive fillers, magnesium carbonate, magnesium dioxide, barium sulfate, silicates, silicon dioxide, graphite, mica, sand, glass beads or fibers, clay, mineral aggregates, wollastonite, and zinc oxide. Inorganic fillers can include particles less than 1 mm in diameter, rods/fibers less than 1 cm in length, and plates less than 0.2 $cm^2$ in surface area. The amount of inorganic filler used can exceed 300 phr; preferably inorganic filler is present at less than 300 phr, more preferably less than 200 phr, and especially preferably less than 100 phr.

In some embodiments, the polymer composition can include one or more clay. The clay may be, for example, montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, or mixtures thereof, and functionalized derivatives thereof. The clay filler is preferably present at between 1 wt % and 80 wt %, more preferably between 5 wt % and 60 wt %, and especially preferably between 10 wt % and 40 wt %, based on the total weight of the composition.

In one or more embodiments, the polymer composition contains no filler. In some cases, it can be preferable for there to be no fillers, or in other cases preferred embodiments can be directed to the absence of specific fillers. Fillers in the nature of unavoidable impurities can of course be present in the case where no fillers are purposefully added but, in some embodiments, it may be useful to further purify ingredients to avoid undesirable impurities if necessary.

Crosslinking Agents, Curative, Cure Packages and Curing Processes

In one or more embodiments, the polymer compositions are generally made with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the polymer's mechanical properties. Physical properties, performance characteristics, and durability of vulcanized (cured) rubbers are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from 150° C. to 190° C. in another embodiment, for about 1 to 150 minutes.

Halogen-containing elastomers may be crosslinked by their reaction with metal oxides. The metal oxide is thought to react with halogen groups in the polymer to produce an active intermediate which then reacts further to produce carbon to carbon bonds. Zinc halide is liberated as a by-product and it serves as an autocatalyst for this reaction. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. It exists as a rhombic 8-member ring or in amorphous polymeric forms. The sulfur vulcanization system may consist of an activator to activate the sulfur, an accelerator, and a retarder to help control the rate of vulcanization. Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of nitrile rubber involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In one embodiment, at least one curing agent(s) is present in the range of 0.2 phr to 10 phr, or 0.5 phr to 5 phr, or in another embodiment in the range of 0.75 phr to 2 phr.

Suitable organic peroxides are not particularly limited, and those, which are used in a rubber industry such as organic peroxide crosslinking agents for crosslinking rubber and polyethylene, may be used in the present invention. Examples of organic peroxides include: dialkyl peroxides, diacyl peroxides and peroxy esters. As specific examples of these organic peroxides, there can be mentioned dialkyl peroxides such as dicumyl peroxide, di-t-butyl peroxide, 2,5-dimethyl-2,5-di(t-butylperoxy)-3-hexyne, 2,5-dimethyl-2,5-di(t-butylperoxy)-3-hexane and 1,3-bis(t-butylperoxyisopropyl)benzene; dialkyl peroxides such as benzoyl peroxide and isobutyryl peroxide; and peroxy esters such as 2,5-dimethyl-2,5-bis(benzoylperoxy)hexane and t-butylperoxyisopropyl carbonate. These organic peroxides may be used either alone or in the form of being dispersed in, for example, clay, calcium carbonate or silica. The organic peroxides may be used as a combination of at least two thereof. The lower limit of the amount of organic peroxide is preferably 0.5 parts by weight, and the upper limit thereof is preferably 10 parts by weight, more preferably 8 parts by weight, and especially preferably 6 parts by weight, based on 100 parts by weight of the nitrile group-containing elastomer.

In one or more embodiments, the polymer composition contains no crosslinking agents.

In one embodiment, the polymer composition contains at least one curing agent in the range of 0.2 phr to 10 phr, or 0.5 phr to 5 phr, or, in another embodiment, in the range of 0.75 phr to 2 phr.

Processing

The elastomeric composition may be mixed by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In other embodiments, additional stages may involve incremental additions of one or more fillers.

In another embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment.

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, is typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

Mixing with the clays is performed by techniques known to those skilled in the art, wherein the clay is added to the polymer at the same time as the carbon black in one embodiment. The processing aids are typically added later in the mixing cycle after the carbon black and clay have achieved adequate dispersion in the elastomeric matrix.

INDUSTRIAL APPLICABILITY

The polymer compositions of the present invention will be useful in a variety of industries: health care, automotive, textiles and adhesives. For example, due to NBR's resilience, the polymer compositions may be used for disposable lab, cleaning, and examination gloves. Further, the polymer compositions may also be used in the automotive industry to make fuel, oil and other fluid handling hoses, seals and grommets, transmission belts, v-belts and synthetic leather. In addition, due NBR's ability to withstand a range of temperatures from −40° C. to 120° C., the polymer compositions would be an ideal material for extreme automotive applications. The polymer compositions may be used for cable jacketing to waterproof cables and employed to waterproof woven and non-woven fabrics. The polymer compositions may be used to create molded goods, footwear, adhesives, sealants, sponge, expanded foams, and floor mats.

In another embodiment, this invention relates to:

1. A polymer composition comprising:

a. about 70 wt % to about 99.5 wt % (preferably 75 wt % to 99 wt %, preferably 80 wt % to 98 wt %), based upon the weight of the composition, of a nitrile-group containing elastomer preferably selected from the group consisting of NBR, XNBR, HNBR, XHNBR, and mixtures thereof, wherein the elastomer has: i) a Mooney viscosity of about 15 MU to about 115 MU (preferably about 30 MU to about 100 MU, preferably about 40 MU to about 80 MU); and ii) a nitrile monomer content of about 0.1 wt % to about 50 wt % (preferably about 10 wt % to about 45 wt %, preferably about 20 wt % to about 40 wt %), based upon the weight of the elastomer; and b. about 0.5 wt % to about 30 wt % (preferably about 1 wt % to about 15 wt %, preferably about 2 wt % to about 10 wt %), based upon the weight of the composition, of a non-functionalized plasticizer, wherein the non-functionalized plasticizer has: i) a kinematic viscosity at 100° C. of about 4 cSt to about 1000 cSt (preferably about 6 to about 300 cSt, preferably about 8 to about 150 cSt); ii) a flash point of about 200° C. or more (preferably about 210° C. or more, about preferably 220° C. or more); iii) a viscosity index of about 120 or more (preferably about 130 or more, preferably about 150 or more); and iv) a specific gravity of about 0.865 or less (preferably about 0.860 or less, preferably about 0.855 or less); and wherein the composition has: i) a 25% compression set at 70 hours and −30° C. that is at least 110% of same composition without the NFP that has been aged at 70 hours and −30° C.; and ii) a retained tensile strength, in MPa, after 168 hours at 175° C., that is at least about 88% (preferably at least about 90%, preferably at least about 93%, preferably at least about 95%) of the retained tensile strength of the same composition that has not been aged.

2. The composition of paragraph 1, wherein the elastomer and the NFP are miscible.

3. The composition of paragraph 1 or 2, wherein the elastomer is a hydrogenated nitrile rubber, preferably, having an iodine value of about 120 or less, preferably about 80 or less, preferably about 50 or less.

4. The composition of paragraph 1, 2 or 3, further comprising one or more fillers, preferably about 0.1 wt % to about 70 wt %, based upon the weight of the composition, of one or more fillers selected from the group consisting of carbon black, silica and mixtures thereof.

5. The composition of any of paragraphs 1 to 4, further comprising one or more curative agents, such as one or more curative agents selected from the group consisting of dicumyl peroxide, di-t-butyl peroxide, 2,5-dimethyl-2,5-di(t-butylperoxy)-3-hexyne, 2,5-dimethyl-2,5-di(t-butylperoxy)-3-hexane, 1,3-bis(t-butylperoxyisopropyl)benzene, benzoyl peroxide and isobutyryl peroxide, 2,5-dimethyl-2,5-bis(benzoylperoxy)hexane, t-butylperoxyisopropyl carbonate, and mixtures thereof.

6. The composition of any of paragraphs 1 to 5, wherein the composition, after 168 hours at 175° C., has a Shore A hardness that is less than about 1.10 times the Shore A hardness (ASTM 2240) of the same composition that has not been aged and/or the composition, after 168 hours at 175° C., has a Shore A hardness that is less than about 1.10 times the Shore A hardness of the same composition without the non-functionalized plasticizer.

7. The composition of any of paragraphs 1 to 6, wherein the composition has less than about less than about 0.5 mole % styrene containing group, and/or less than about 0.1 wt % isobutylene monomer.

8. The composition of any of paragraph 1 to 7, wherein the nitrile-group containing elastomer is NBR or HNBR.

9. The composition of any of paragraphs 1 to 8, wherein the composition has a low temperature brittleness of about −20° C. or less, preferably about −30° C. or less.

10. The composition of any of paragraphs 1 to 9, wherein the composition, after 168 hours at 175° C., has a Shore A hardness that is less than about 1.10 times the Shore A hardness of the same composition that has not been aged and/or a Shore A hardness that is greater than 0.6 times the Shore A hardness of the same composition that has not been aged.

11. The composition of any of paragraphs 1 to 10, wherein the composition has a 25% compression set when stored at −30° C. for 70 hours that is at least 20% lower than of the same composition without the NFP stored at the same conditions.

12. The composition of any of paragraphs 1 to 11, wherein the composition has a 25% compression set when stored at −30° C. for 22 hours, allowed to warm to room temperature (32° C.) for one hour, then stored at −30° C. for another 48 hours that is at least 20% lower than of the same composition without the NFP and stored in the same manner.

13. The composition of any of paragraphs 1 to 12, wherein the NFP is a polyalphaolefin.

14. The composition of any of paragraphs 1 to 13, wherein the NFP is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures.

15. A polymer composition comprising:
    a. about 70 wt % to about 99.5 wt %, based upon the weight of the composition, of a nitrile-group containing elastomer selected from the group consisting of acrylonitrile-butadiene copolymer rubber (NBR), carboxylated acrylonitrile-butadiene copolymer rubber (XNBR), at least partially hydrogenated acrylonitrile-butadiene copolymer rubber (HNBR), at least partially hydrogenated carboxylated acrylonitrile-butadiene rubber (XHNBR), and mixtures thereof; and
    b. about 0.5 wt % to about 30 wt %, based upon the weight of the composition, of a non-functionalized plasticizer.

Test Methods

For purpose of this invention and the claims thereto, unless otherwise noted, the following tests shall be used for the indicated property. Tensile Properties were determined according to ASTM D 412. Compression set was determined according to ASTM D 395. Shore A hardness set was determined according to ASTM D 2240. Iodine value is determined according to ASTM 5902.

Test specimens for mechanical property testing were injection-molded following ASTM D 618 as closely as possible, and tested at room temperature (23±2° C.).

Tensile Properties (including 100% modulus, tensile strength and % strain at break) were determined according to ASTM D 412 at room temperature using an Instron 4202. The specimens were pulled at a crosshead speed 20 inches per minute. (approx 51 mm/min) and the stress/strain data was recorded. Injection-molded tensile bars were of ASTM D 412 Type IV geometry, tested at a speed of 2 inches per min. Plasticized blends were prepared by mixing polymer with the plasticizer and other additives in a Banbury mixer. Blends were compression molded into plaques about 2 mm thick and about 100 cm² area between sheets of Teflon-coated aluminum foil using a heated hydraulic press at 190° C., a molding time of 15 min, and a press force of 10,000 lbf (44.5 kN).

Mooney viscosity was measured according to ASTM D 1646 (100° C., ML 1+4). Mooney Scorch Time was measured according to ASTM D 1646 (125° C. for 60 min, 1 min preheat t5). Cure properties were measured using an MDR 2000 from Alpha Technologies, Inc., at the indicated temperature and 0.5 degree arc, based on ASTM D 5289. The values "MH" and "ML" used herein refer to "maximum torque" and "minimum torque," respectively. The "MS" value is the Mooney scorch value, and the "ML 1+4" value is the Mooney viscosity value. The values of "Tc" are cure times in minutes, and "Ts" is scorch time in minutes.

Other test methods are listed in Table A.

TABLE A

| Test Methods | | |
|---|---|---|
| Parameter | Units | Test |
| Moving Die Rheometer (MDR) 160° C. for 60 min, ±0.5° arc | | |
| ML | deciNewton.meter | ASTM D 5289 |
| MH | dNewton.m | |
| t10 | minutes | |
| t90 | minutes | |
| PeakRate | dNm/min | |
| MH − ML | deciNewton.meter | |

TABLE A-continued

Test Methods

| Parameter | Units | Test |
|---|---|---|
| Moving Die Rheometer (MDR) 180° C. for 30 min, ±0.5° arc | | |
| ML | deciNewton.meter | ASTM D 5289 |
| MH | dNewton.m | |
| t10 | minutes | |
| t90 | minutes | |
| PeakRate | dNm/min | |
| MH – ML | deciNewton.meter | |

A listing of the typical properties for the NFPs used in the examples is in Table B.

TABLE B

NFP Typical Properties

| | ASTM Method | NFP-10 | NFP-40 |
|---|---|---|---|
| Specific Gravity | D 4052 (15.6/15.6° C.) | 0.835 | 0.850 |
| Kinematic Viscosity at 100° C., cSt | D 445 | 10 | 39 |
| Pour Point, ° C. | D 97 | −48 | −42 |
| Flash Point, ° C. | D 92 | 266 | 286 |
| Viscosity Index | D 2270 | 137 | 147 |

NFP-40 is a polyalphaolefin available from ExxonMobil (Houston, Texas) under the tradename SpectraSyn ™ 40. NFP-10 is a polyalphaolefin available from ExxonMobil (Houston, Texas) under the tradename SpectraSyn ™ 10.

A listing of various components used in the polymer compositions of the examples is in Table C.

TABLE C

Various Components in Polymer Compositions

| Material | Brief Description | Source |
|---|---|---|
| Zetpol 2010 | HNBR reported to have 36% acrylonitrile, 78-92 MU, Specific gravity of 0.95, 96% hydrogenation and an iodine value of 11 | Zeon Chemical, L.P. |
| N774 | Carbon black. | |
| ZMTI | Zinc 2-mercaptotoluimidazole | |
| Antioxidant | VANOX CDPA, a diphenyl amine | R. T. Vanderbuilt |
| Kadox 920 | Zinc Oxide | Zinc Corp of America |
| TOTM | Tris (2-ethylhexyl)trimellitate | R. E. Carroll, Inc. |
| Sunpar 2280 | mineral oil reportedly having a KV100 of 31 cSt, a KV40 of 475 cst, a VI of 95, a pour point of −9° C., a specific gravity of 0.899, and a flash point of 305° C. | Sunoco, Sun Lubricant systems |
| Crosslinking agent | VANOX 802-40KE | R. T Vanderbuilt |

The formulations for a nitrile-group containing elastomer, namely, a cured HNBR, are listed in Table D, wherein the amounts of each component is given in phr. Three NFPs were evaluated as plasticizers in nitrile-group containing elastomers: NFP-10, a 50/50 NFP-10/NFP-40 blend and NFP-40. Further, the nitrile-group containing elastomer without any plasticizer was used as a blank, and two commercially available plasticizers: Tris (2-Ethylhexyl)Trimellitate (TOTM), and Sunpar™ 2280 were used as a control group to facilitate comparisons.

TABLE D

| | Blank | Control 1 | Control 2 | NFP-10 | NFP-10/NFP-40 50/50 blend | NFP-40 |
|---|---|---|---|---|---|---|
| Density, kg/L | 1.206 | 1.202 | 1.194 | 1.19 | 1.19 | 1.191 |
| HNBR 36/85, phr | 100 | 100 | 100 | 100 | 100 | 100 |
| Carbon Black, phr | 50 | 50 | 50 | 50 | 50 | 50 |
| Zinc Oxide, phr | 3 | 3 | 3 | 3 | 3 | 3 |
| ZMTI Antioxidant, phr | 1 | 1 | 1 | 1 | 1 | 1 |
| Antioxidant, phr | 1.5 | 1.5 | 1.5 | 1.5 | 1.5 | 1.5 |
| Crosslinking Agent, phr | 8 | 8 | 8 | 8 | 8 | 8 |
| TOTM Plasticizer, phr | | 5 | | | | |
| Sunpar ™ 2280 Plasticizer, phr | | | 5 | | | |
| NFP-10, phr | | | | 5 | 2.5 | |
| NFP-40, phr | | | | | 2.5 | 5 |
| Total, phr | 163.5 | 168.5 | 168.5 | 168.5 | 168.5 | 168.5 |

The polymer compositions were mixed in a 1 L Banbury™ internal mixer using a two-stage mixing procedure with the final curatives (e.g., ZnO) added in the second stage. The polymer compositions were tested for a range of processing, curing and physical properties, the data is presented in Tables E-K.

TABLE E

Moving Die Rheometer (MDR)

|  | Blank | Control 1 | Control 2 | NFP-10 | NFP-10/NFP-40 | NFP-40 |
|---|---|---|---|---|---|---|
| Test Temperature, ° C. | 171 | 171 | 171 | 171 | 171 | 171 |
| Test Time, min. | 60 | 60 | 60 | 60 | 60 | 60 |
| Oscillating Angle, Deg. | 0.5 | 0.5 | 0.5 | 0.5 | 0.5 | 0.5 |
| ML, dNm | 1.87 | 1.53 | 1.74 | 1.77 | 1.8 | 1.78 |
| MH, dNm | 25.46 | 20.88 | 20.03 | 19.98 | 19.64 | 21.27 |
| MH-ML, dNm | 23.59 | 19.35 | 18.29 | 18.21 | 17.84 | 19.49 |
| ts1, min. | 0.7 | 0.81 | 0.84 | 0.85 | 0.86 | 0.81 |
| ts2, min. | 0.96 | 1.13 | 1.19 | 1.23 | 1.24 | 1.15 |
| t25, min. | 1.83 | 1.92 | 1.99 | 2.03 | 2.05 | 1.97 |
| t50, min. | 3.44 | 3.5 | 3.63 | 3.7 | 3.75 | 3.62 |
| t75, min. | 6.32 | 6.32 | 6.5 | 6.59 | 6.71 | 6.53 |
| t90, min. | 10.19 | 10.09 | 10.27 | 10.43 | 10.53 | 10.38 |
| t95, min. | 12.98 | 12.82 | 13.04 | 13.18 | 13.47 | 13.14 |
| Peak Rate, dNm/min. | 4.62 | 3.75 | 3.33 | 3.31 | 3.15 | 3.63 |
| Peak Time, min. | 1.71 | 1.91 | 1.95 | 1.96 | 2.03 | 1.86 |
| tMH, dNm | 26.75 | 27.17 | 27.33 | 26.33 | 28.72 | 28.01 |
| Average t90, min. | 10.33 | N/A | N/A | N/A | N/A | N/A |
| Standard Deviation, min. | 0.191 | N/A | N/A | N/A | N/A | N/A |

*The consistency of t90 values for indicates that the crosslinking in the samples is reasonably uniform.

TABLE F

Mooney Viscosity Data

|  | Blank | Control 1 | Control 2 | NFP-10 | NFP-10/NFP-40 | NFP-40 |
|---|---|---|---|---|---|---|
| Test Temperature, ° C. | 100 | 100 | 100 | 100 | 100 | 100 |
| Test Time, min. | 4 | 4 | 4 | 4 | 4 | 4 |
| Preheat, min. | 1 | 1 | 1 | 1 | 1 | 1 |
| Init, MU | 173.9 | 149.1 | 135 | 131 | 137.5 | 134.1 |
| Mm, MU | 118.4 | 97.9 | 84 | 82.1 | 82.6 | 88.5 |
| tMm, min. | 3.9 | 3.9 | 3.9 | 4.0 | 3.8 | 3.9 |
| Mooney Viscosity, MU | 119 | 98.3 | 84.1 | 82.1 | 83.2 | 88.6 |

**Note the NFP-10 and NFP-10/NFP-40 were the most efficient at reducing the Mooney viscosity value. In contrast, the Mooney viscosity for the Control 1 sample is higher likely because the TOTM plasticizer is slightly polar.

TABLE G

Retained Tensile Strength

|  | Blank | Control 1 | Control 2 | NFP-10 | NFP-10/NFP-40 | NFP-40 |
|---|---|---|---|---|---|---|
| Initial Tensile Strength (TS), MPa | 23.743 | 24.545 | 21.956 | 22.5 | 22.043 | 22.406 |
| TS (168 hr., 175° C.), MPa | 24.449 | 20.301 | 19.386 | 20.254 | 20.724 | 21.627 |
| TS (168 hr., 175° C.), % | 102.9 | 79.1 | 86.7 | 88.9 | 93.6 | 96.4 |
| TS (168 hr., 150° C.), MPa | 24.089 | 23.197 | 21.522 | 21.326 | 20.557 | 21.39 |
| TS (168 hr., 150° C.), % | 101.4 | 94.2 | 98.0 | 94.5 | 92.8 | 95.3 |

TABLE H

Retained Strain At Break

|  | Blank | Control 1 | Control 2 | NFP-10 | NFP-10/NFP-40 | NFP-40 |
|---|---|---|---|---|---|---|
| Initial Strain At Break (BS), MPa | 314.07 | 414.93 | 445.52 | 375.71 | 471.26 | 422.98 |
| BS (48 hr., 175° C.), MPa | 275.92 | 332.46 | 337.96 | 307.6 | 321.02 | 320.25 |
| BS (48 hr., 175° C.), % | 87.9 | 80.1 | 75.9 | 81.9 | 68.1 | 75.7 |
| BS (168 hr., 175° C.), MPa | 191.85 | 185.16 | 180.18 | 205.43 | 226.22 | 211.14 |

TABLE H-continued

| Retained Strain At Break | | | | | | |
|---|---|---|---|---|---|---|
| | Blank | Control 1 | Control 2 | NFP-10 | NFP-10/ NFP-40 | NFP-40 |
| BS (168 hr., 175° C.), % | 61.1 | 44.6 | 40.4 | 54.7 | 48.0 | 49.9 |
| BS (168 hr., 150° C.), MPa | 271.71 | 331.81 | 346.12 | 341.07 | 365.46 | 320.12 |
| BS (168 hr., 150° C.), % | 84.4 | 74.9 | 72.0 | 89.8 | 71.1 | 67.9 |

TABLE I

| Tensile Modulus | | | | | | |
|---|---|---|---|---|---|---|
| | Blank | Control 1 | Control 2 | NFP-10 | NFP-10/ NFP-40 | NFP-40 |
| Initial 100% Tensile Modulus (TM), MPa | 3.645 | 2.901 | 2.779 | 3.249 | 2.715 | 2.944 |
| 100% TM (48 hr., 175° C.), MPa | 6.658 | 5.691 | 5.147 | 5.47 | 4.803 | 5.403 |
| ΔTM (48 hr., 175° C.), MPa | 3.011 | 2.79 | 2.368 | 2.221 | 2.088 | 2.459 |
| TM (48 hr., 175° C.), % | 145.2 | 149.0 | 146.0 | 140.6 | 143.5 | 145.5 |
| 100% TM (168 hr., 175° C.), MPa | 11.99 | 10.046 | 9.589 | 9.532 | 8.857 | 9.326 |
| ΔTM (168 hr., 175° C.), MPa | 8.345 | 7.145 | 6.81 | 6.283 | 6.142 | 6.382 |
| TM (168 hr., 175° C.), % | 169.8 | 171.1 | 171.0 | 165.9 | 169.3 | 168.4 |
| 100% TM (168 hr., 150° C.), MPa | 6.993 | 5.671 | 5.122 | 5.757 | 4.954 | 5.51 |
| ΔTM (168 hr., 150° C.), MPa | 3.348 | 2.77 | 2.343 | 2.508 | 2.239 | 2.586 |
| TM (168 hr., 150° C.), % | 147.9 | 148.8 | 145.7 | 143.6 | 145.2 | 146.6 |

TABLE J

| Shore A Hardness | | | | | | |
|---|---|---|---|---|---|---|
| | Blank | Control 1 | Control 2 | NFP-10 | NFP-10/ NFP-40 | NFP-40 |
| Initial Shore A | 66 | 62 | 60 | 63 | 62 | 64 |
| Shore A (48 hr., 175° C.) | 74 | 70 | 70 | 71 | 70 | 70 |
| ΔShore A (48 hr., 175° C.) | 8 | 8 | 10 | 8 | 6 | 8 |
| Shore A (168 hr., 175° C.) | 80 | 79 | 77 | 79 | 77 | 78 |
| ΔShore A (168 hr., 175° C.) | 14 | 17 | 17 | 16 | 13 | 16 |
| Shore A (168 hr., 150° C.) | 75 | 72 | 72 | 73 | 73 | 72 |
| ΔShore A (168 hr., 150° C.) | 9 | 10 | 12 | 10 | 9 | 10 |

TABLE K

| 5% Compression Set | | | | | | |
|---|---|---|---|---|---|---|
| | Blank | Control 1 | Control 2 | NFP-10 | NFP-10/ NFP-40 | NFP-40 |
| Compression Set, % 70 hr/150° C. | 43 | 32 | 39 | 45 | 54 | 47 |
| Compression Set, % 22 hr/−30° C. | 4.58 | 4.69 | 5.56 | 4.84 | 7.26 | 7.38 |
| Compression Set, % 70 hr/−30° C. | 3.05 | 2.38 | 2.38 | 3.17 | 1.61 | 3.17 |

All patents and patent applications, test procedures (such as ASTM methods, UL methods, and the like), and other documents cited herein are fully incorporated by reference to the extent they are not inconsistent with this invention, provided, however, that any priority document not named in the initially filed application or filing documents is NOT incorporated by reference herein. As is apparent from the forgoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term.

What is claimed is:

1. A polymer composition comprising:
   a. about 85 wt % to about 97.5 wt %, based upon the weight of a, and b, of a nitrile-group containing elastomer selected from the group consisting of acrylonitrile-butadiene copolymer rubber, carboxylated acrylonitrile-butadiene copolymer rubber, at least partially hydrogenated acrylonitrile-butadiene copolymer rubber, at least partially hydrogenated carboxylated acrylonitrile-butadiene rubber, and mixtures thereof, wherein the elastomer has:
      i. a Mooney Viscosity of about 15 MU to about 115 MU; and
      ii. a nitrile monomer content of about 0.1 wt % to about 50 wt %, based upon the weight of the elastomer; and
   b. about 2.5 wt % to about 7.5 wt %, based upon the weight of a, and b, of a non-functionalized plasticizer ("NFP"), wherein the NFP is a polyalphaolefin derived from $C_5$ to $C_{18}$ alphaolefins and has:
      i. a kinematic viscosity at 100° C. of about 4 cSt to about 1000 cSt;
      ii. a flash point of about 200° C. or more;
      iii. a viscosity index of about 120 or more; and
      iv. a specific gravity of about 0.865 or less; and wherein the composition has:
  i. a 25% compression set at 70 hours and −30° C. that is at least 110% of the same composition without the NFP; and
  ii. a retained tensile strength, in MPa, after 168 hours at 175° C., that is at least about 88% of the retained tensile strength of the same composition that has not been aged.

2. The composition of claim 1, wherein the nitrile monomer content is about 10 wt % to about 45 wt %.

3. The composition of claim 1, wherein the elastomer and the NFP are miscible.

4. The composition of claim 1, wherein the elastomer is a hydrogenated nitrile rubber.

5. The composition of claim 1, wherein the elastomer is a hydrogenated nitrile rubber having an iodine value of about 120 or less.

6. The composition of claim 1, further comprising one or more fillers.

7. The composition of claim 1, further comprising about 0.1 wt % to about 70 wt %, based upon the weight of the composition, of one or more fillers selected from the group consisting of carbon black, silica and mixtures thereof.

8. The composition of claim 1, further comprising one or more curative agents.

9. The composition of claim 1, wherein the elastomer is hydrogenated nitrile rubber and the composition further comprises one or more curative agents.

10. The composition of claim 1, wherein the elastomer is hydrogenated nitrile rubber and the composition further comprises one or more curative agents selected from the group consisting of dicumyl peroxide, di-t-butyl peroxide, 2,5-dimethyl-2,5-di(t-butylperoxy)-3-hexyne, 2,5-dimethyl-2,5-di(t-butylperoxy)-3-hexane, 1,3-bis(t-butylperoxyisopropyl)benzene, benzoyl peroxide and isobutyryl peroxide, 2,5-dimethyl-2,5-bis(benzoylperoxy)hexane, t-butylperoxyisopropyl carbonate, and mixtures thereof.

11. The composition of claim 1, wherein the composition has a low temperature brittleness of about −30° C. or less.

12. The composition of claim 1, wherein the nitrile-group containing elastomer is about 80 wt % to about 98 wt %; the elastomer has a nitrile monomer content of about 20 wt % to about 40 wt %; and the NFP is about 2 wt % to about 10 wt %.

13. The composition of claim 1, wherein the composition, after 168 hours at 175° C., has a Shore A hardness that is less than about 1.10 times the Shore A hardness of the same composition that has not been aged.

14. The composition of claim 1, wherein the composition has less than about 0.5 mole % styrene containing group.

15. The composition of claim 1, wherein the composition has a low temperature brittleness of about −20° C. or less.

16. The composition of claim 1, wherein the composition has a Shore A hardness that is less than 1.10 times the Shore A hardness of the same composition that has not been aged and is greater than 0.6 times the Shore A hardness of the same composition that has not been aged.

17. The composition of claim 1, wherein the composition has a 25% compression set when stored at −30° C. for 70 hours that is at least 20% lower than of the same composition without the NFP.

18. The composition of claim 1, wherein the composition has a 25% compression set when stored at −30° C. for 22 hours, allowed to warm to room temperature (32° C.) for one hour, then stored at −30° C. for another 48 hours that is at least 20% lower than of the same composition without the NFP.

19. The composition of claim 1, wherein the NFP is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures.

20. A polymer composition comprising:
  a. about 85 wt % to about 97.5 wt %, based upon the weight of a, and b, of a nitrile-group containing elastomer selected from the group consisting of acrylonitrile-butadiene copolymer rubber, carboxylated acrylonitrile-butadiene copolymer rubber, at least partially hydrogenated acrylonitrile-butadiene copolymer rubber, at least partially hydrogenated carboxylated acrylonitrile-butadiene rubber, and mixtures thereof; and
  b. about 2.5 wt % to about 7.5 wt %, based upon the weight of a, and b, of a NFP, wherein the NFP is a polyalphaolefin derived from $C_5$ to $C_{18}$ alphaolefins.

* * * * *